(12) United States Patent
Frolov et al.

(10) Patent No.: US 8,616,104 B2
(45) Date of Patent: Dec. 31, 2013

(54) PORTABLE TABLE SAW

(75) Inventors: Andrew Frolov, Glenview, IL (US); Jason Feldner, Mount Prospect, IL (US); Carl Cepress, Cincinnati, OH (US)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 12/834,795

(22) Filed: Jul. 12, 2010

(65) Prior Publication Data
US 2012/0006170 A1 Jan. 12, 2012

(51) Int. Cl.
*B23D 33/02* (2006.01)

(52) U.S. Cl.
USPC .......... 83/471; 83/473; 83/477.2; 83/581

(58) Field of Classification Search
USPC ........ 83/477.2, 581, 435, 435.11, 437.1, 474, 83/471, 473; 144/286.5, 287, 286.1
See application file for complete search history.

(56) References Cited

U.S. PATENT DOCUMENTS

| | | | |
|---|---|---|---|
| 2,963,128 A | 12/1960 | Rapp | |
| 3,931,751 A * | 1/1976 | Simonson | 83/859 |
| 4,377,099 A | 3/1983 | Howe | |
| 4,693,156 A | 9/1987 | Olvera | |
| 4,770,915 A | 9/1988 | Nakagawa et al. | |
| 4,772,502 A | 9/1988 | Okura et al. | |
| 4,976,251 A | 12/1990 | Smith | |
| 5,174,349 A | 12/1992 | Svetlik et al. | |
| D354,757 S | 1/1995 | Wixey | |
| 5,405,668 A | 4/1995 | Sandt | |
| 5,619,896 A | 4/1997 | Chen | |
| D394,071 S | 5/1998 | Ceroll et al. | |
| 5,778,953 A * | 7/1998 | Braddock | 144/286.1 |
| D411,090 S | 6/1999 | Chang | |
| 5,981,023 A | 11/1999 | Tozuka et al. | |
| 6,164,447 A | 12/2000 | Svetlik | |
| D458,947 S | 6/2002 | Svetlik et al. | |
| 6,986,370 B1 | 1/2006 | Schoene et al. | |
| 7,066,068 B1 * | 6/2006 | Caldwell | 83/435 |
| 2004/0055915 A1 | 3/2004 | Dreher et al. | |
| 2004/0187666 A1 * | 9/2004 | Huang | 83/477.2 |
| 2005/0092155 A1 | 5/2005 | Phillips et al. | |
| 2006/0070503 A1 * | 4/2006 | Shibata et al. | 83/438 |
| 2007/0245869 A1 * | 10/2007 | Welsh et al. | 83/438 |
| 2007/0246869 A1 | 10/2007 | Rymarchyk et al. | |
| 2009/0178593 A1 * | 7/2009 | Yu | 108/28 |
| 2011/0067540 A1 * | 3/2011 | Frolov et al. | 83/467.1 |

FOREIGN PATENT DOCUMENTS

| | | |
|---|---|---|
| EP | 0017987 A1 | 10/1980 |
| EP | 1527848 A2 | 5/2005 |
| EP | 1847347 A2 | 10/2007 |

OTHER PUBLICATIONS

International Search Report in corresponding PCT Application (i.e., PCT/US2011/043168), mailed Oct. 13, 2011 (11 pages).

* cited by examiner

*Primary Examiner* — Omar Flores Sanchez
(74) *Attorney, Agent, or Firm* — Maginot, Moore & Beck

(57) ABSTRACT

A table saw includes a support arrangement, a table top assembly connected to the support arrangement, the table top assembly having (i) a work piece support surface, and (ii) a saw blade opening defined in the work piece support surface, a saw assembly supported under the table top assembly including a saw blade, and a saw assembly adjustment mechanism having a user actuator. The user actuator causes movement of the saw blade in relation to the work piece support surface. A first extension element extends from the support arrangement and defines a first extension space, and a second extension element extends from the support arrangement and defines a second extension space, wherein a first protection zone is defined between the first extension space and the second extension space, and wherein the actuator is completely contained within the first protection zone.

18 Claims, 22 Drawing Sheets

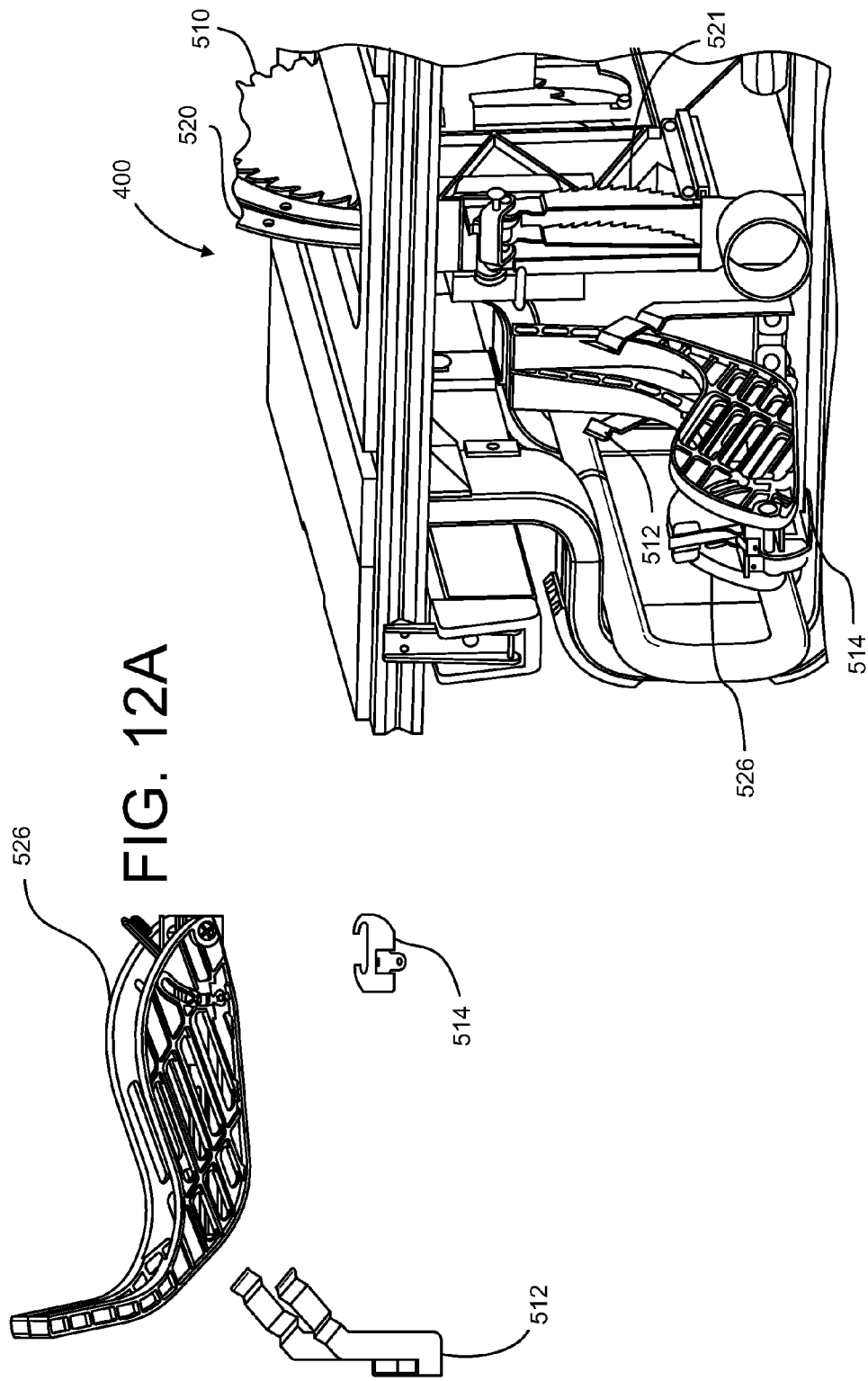

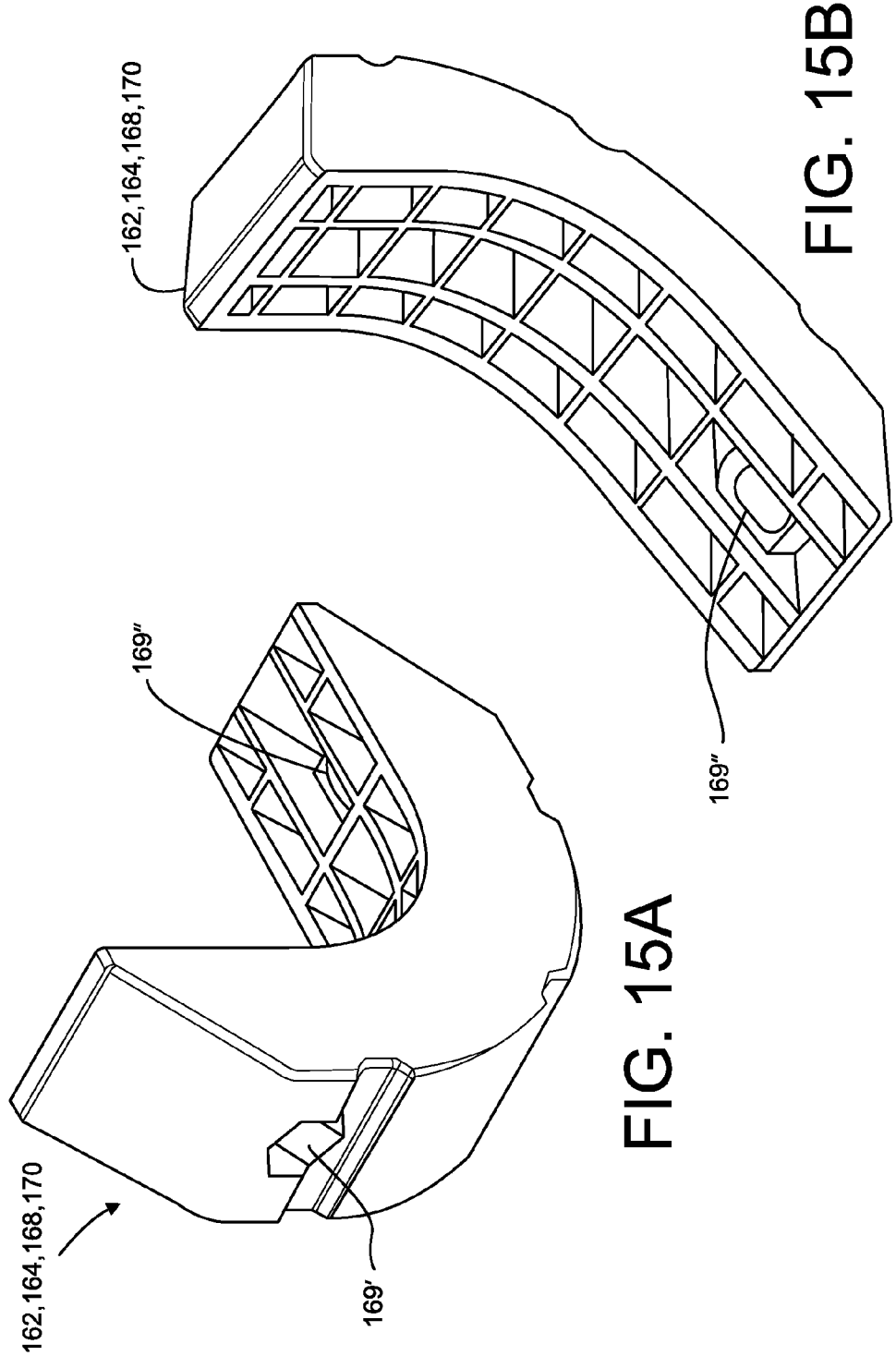

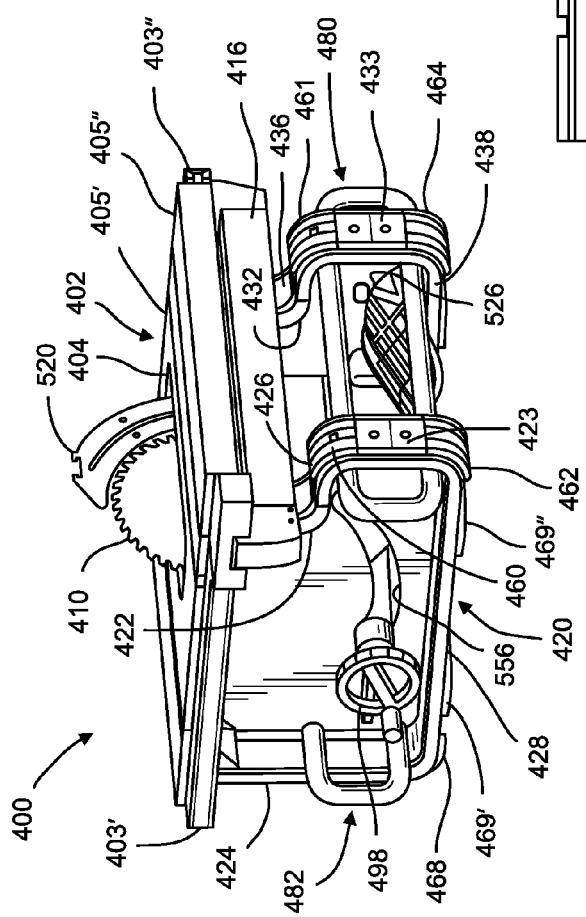
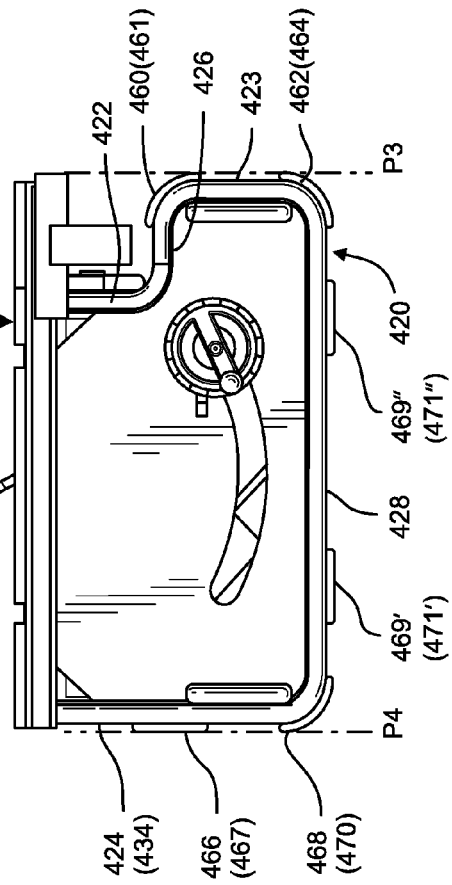

PORTABLE TABLE SAW

FIELD

The invention relates to a power table saw, and in particular to a portable power table saw.

BACKGROUND

Table saws are often used in the construction industry. In particular, at a construction jobsite where workers cut and shape a large number of wood products portable table saws are used. For example, framers use portable table saws for rough-cutting lumber, while finishing carpenters use portable power saws capable of making rip and miter cuts for producing precise finishing cuts of trim pieces.

In the construction industry it is commonplace for the workers to transport their table saw and other tools from one construction site to another. In doing so, the table saw may be placed in a transport vehicle, e.g., bed of a pickup truck, along side of other tools. The table saw has to be compact to take a small space and be easy to store. Often the table saw is roughly handled by the worker during placement of the table saw into the transport vehicle.

In addition, during transport the table saw may be knocked around and collide with the other tools. For example, during transport of the table saw from one location to another, the table saw may slide around in the bed of a pickup truck and collide with the bed walls and/or tailgate of the truck. Such collisions may be detrimental to certain components of the table saw. In particular, the table saw may have controls, actuators, and other components that extend from the front side and back side of the table saw which may be damaged during such collisions. One such actuator is an actuator for adjusting position of a saw blade of a saw assembly of the table saw. This actuator is configured to adjust the height and bevel angle of the saw blade that is extending through an opening in the top surface of the table saw. Because this actuator typically projects outwardly from the front side of the table saw, it is particularly prone to being damaged due to the table saw sliding within a bed of a pickup truck and colliding with the bed walls and the tailgate. Therefore, one desirable feature of a table saw is durability during loading and transport of the table saw from one job site to another including protecting such table saw controls, actuators, and other similarly situated components.

Once at the jobsite, the workers grasp the table saw by a handle and transfer it from the transport vehicle to the jobsite. The table saw may be bulky and heavy. The table saw may have concentrations of mass, e.g., due to a heavy motor, at various positions within the table saw. These concentrations of mass may cause the table saw to be awkward to carry during transfer. Therefore, transfer of the table saw from the transport vehicle to the jobsite may be difficult and requires two hands. Thus, another desirable feature for a table saw is ease of transfer from the transport vehicle to the jobsite.

The table saw may have several accessories that can be attached to it. For example, a blade guard is typically included with a table saw. An anti-kick back device and a push stick are other commonplace accessories that are included with a table saw. Yet another accessory that is typically included with a table saw is a rip fence that is coupled to rails of the power saw.

A typical issue for the workers with respect to these accessories is keeping the accessories in a place where they are easily retrievable. However, often times, these accessories are left at job sites and thereby lost. Therefore, another desirable feature of the table saw is to provide convenient stowage capabilities for the accessories and protect them from damage.

SUMMARY

According to one embodiment of the present disclosure, there is provided a table saw. The table saw includes a support arrangement, and a table top assembly connected to the support arrangement, the table top assembly having (i) a work piece support surface, and (ii) a saw blade opening defined in the work piece support surface. The table saw further includes a saw assembly supported under the table top assembly and having a saw blade that extends through the saw blade opening. In addition, the table saw includes a saw assembly adjustment mechanism having a user actuator, wherein the saw assembly adjustment mechanism is configured so that movement of the user actuator causes movement of the saw blade in relation to the work piece support surface. The table saw also includes a first extension element extending from the support arrangement and defining a first extension space, and a second extension element extending from the support arrangement and defining a second extension space. A first protection zone is defined between the first extension space and the second extension space. Also, the user actuator is completely contained within the first protection zone.

BRIEF DESCRIPTION OF THE DRAWINGS

FIG. 12A depicts a perspective view of the blade guard of the table saw assembly of FIG. 1 and two clips for stowing the blade guard;

FIG. 12B depicts a perspective view of a table saw assembly according to another embodiment of the present disclosure showing a blade guard and an anti-kick back device in a stowed position, a riving knife positioned in an operative position above a work piece support surface, and a rip fence in the stowed position;

FIG. 15A depicts a perspective view of the bumper shown in FIG. 14;

FIG. 15B depicts another perspective view of the bumper shown in FIG. 14;

FIG. 19 depicts a perspective view of the table saw assembly of FIG. 12B including a work piece support surface, leg units, handle units, a saw undercarriage assembly including a saw blade and a motor, the saw blade shown partially above the work piece support surface, the blade guard shown below the work piece support surface in a stowed position, the riving knife shown above the work piece support surface, a panel, an adjustment mechanism positioned at one end of an aperture formed in the panel, the rip fence shown below the work piece support surface in a stowed position, and bumpers disposed on the leg units; and FIG. 20 is a front elevation view of the table saw assembly of FIG. 19 with the adjustment mechanism positioned at another end of the aperture to place the blade in a beveled position.

DESCRIPTION

Figure 1:
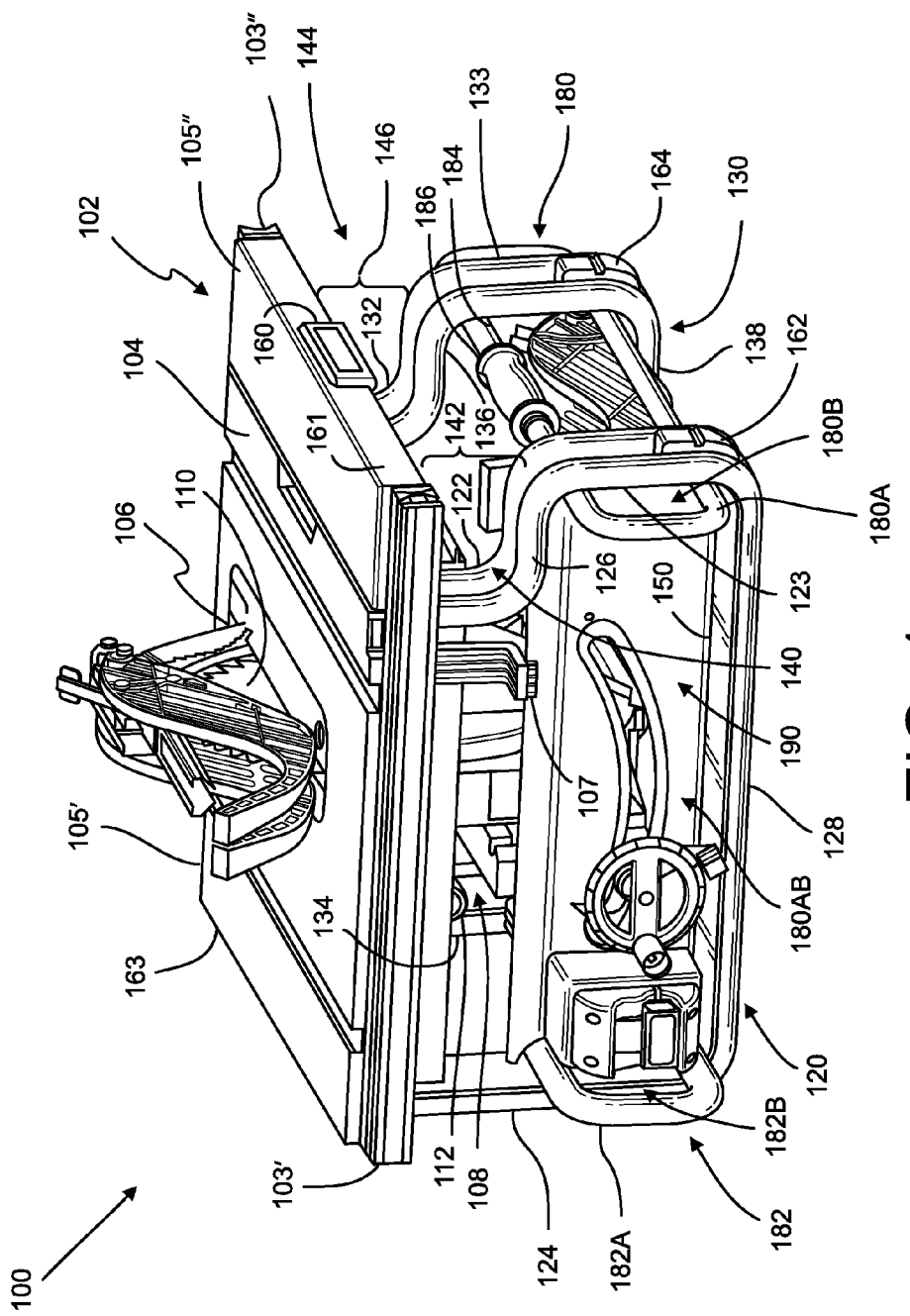
FIG. 1 depicts a perspective view of a table saw assembly according to one aspect of the present disclosure including a work piece support surface, leg units, handle units, a saw undercarriage assembly including a motor and a saw blade, with the saw blade shown above the work piece support surface, a blade guard shown above and below the work piece support surface in its operative and stowed positions, respectively, an anti-kick back device shown above the work piece support surface in its operative, a panel, a user actuator, and bumpers.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a table saw assembly 100 is depicted. The table saw assembly 100 includes a support arrangement generally referenced by the reference numeral 101. The table saw assembly further includes a table top assembly 102. The table top assembly 102 includes rails 103' and 103", a main table portion 105', an extension table portion 105", a saw blade opening 106, and a table extension lock lever 107. The saw blade opening 106 is formed substantially centrally in the main table portion 105'. The main table portion 105' and the extension table portion 105" define a work piece support surface 104. The extension table portion 105" is positioned aligned with the main table portion 105' and is configured to couple the rails 103' and 103". The table extension lock lever 107 is configured to lock in the extension table portion 105" with the rails 130' and 103". The table top assembly 102 is connected to the support arrangement 101.

The table saw assembly 100 also includes a saw assembly or saw undercarriage assembly 108. The saw undercarriage assembly 108 includes a blade 110 rotatably mounted onto a motor 112 (shown in greater detail in FIG. 2). The blade 110 is configured to extend through the blade opening 106 and is further configured to raise, lower and bevel with respect to the work piece support surface 104, as further described below.

Figure 2:
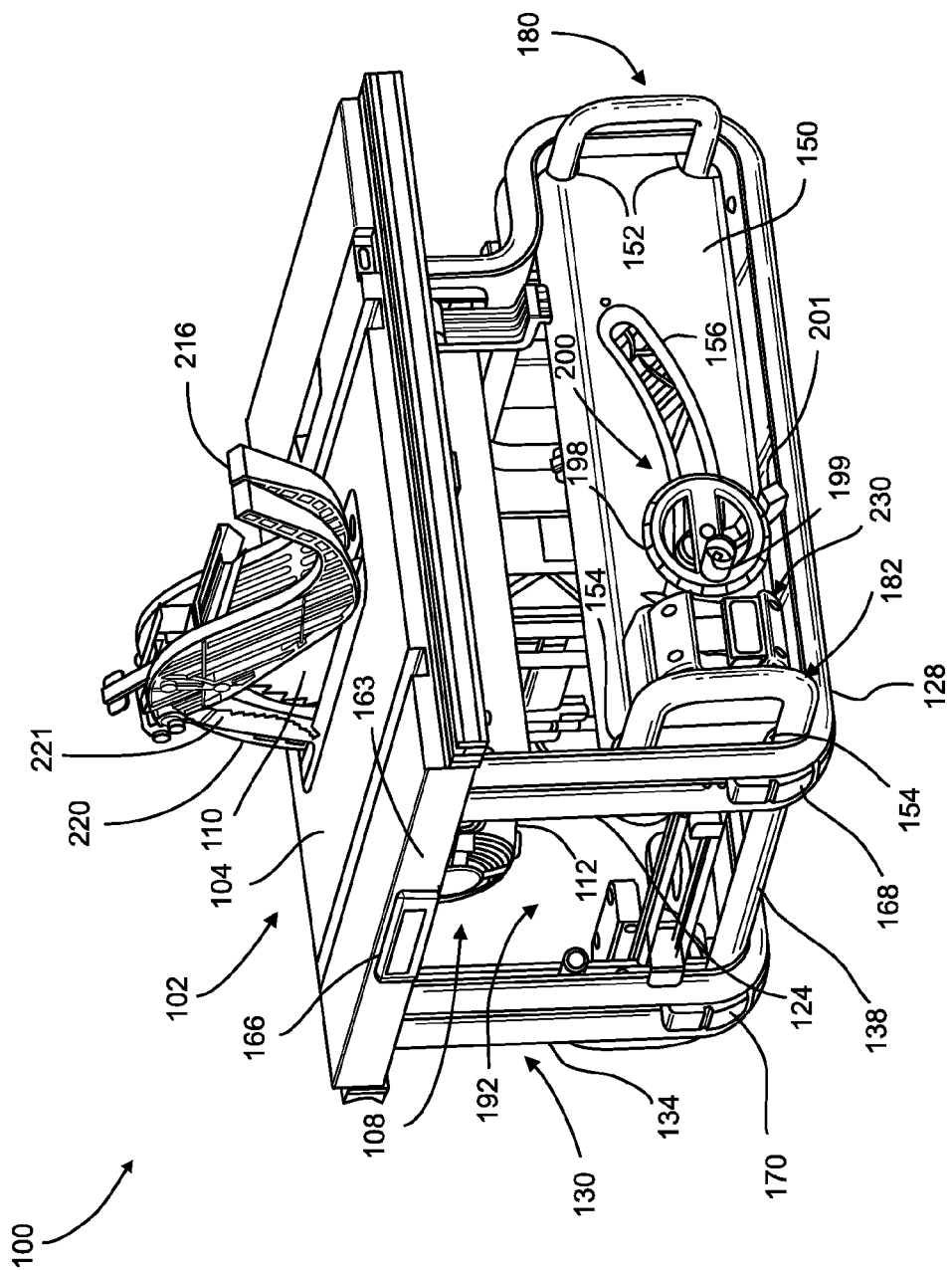
FIG. 2 depicts another perspective view of the table saw assembly of FIG. 1.

The saw assembly 100 also includes an adjustment mechanism 200, depicted and referenced in FIG. 2. The adjustment mechanism 200 includes various actuators such as a bevel adjustment locking lever 201, a height adjustment wheel 198, and a height adjustment wheel handle 199. Note that the height adjustment wheel also functions as a bevel adjustment actuator since side movement of the height adjustment wheel causes the saw blade 110 to bevel in relation to the work piece support surface 104, when the locking lever 201 is in an unlocked position.

The support arrangement 101 of the table saw assembly 100 includes front and rear leg units 120 and 130. The front leg unit 120 includes downwardly extending leg portions 122, 123, and 124. The front leg unit 120 also includes transversely extending leg portions 126 and 128. The rear leg unit 130 includes downwardly extending leg portions 132, 133, and 134, further referenced and depicted in FIG. 2. Similarly, the rear leg unit 130 also includes transversely extending leg portions 136 and 138.

The space between the transversely extending leg portion 126 and the table top assembly 102 defines a rip fence storage space 140, while the space between the transversely extending leg portion 136 and the table top assembly 102 defines a storage space 144. Also, the vertical opening between the downwardly extending leg portion 123 and the table top assembly 102, defines an access opening 142. Similarly, the vertical opening between the downwardly extending leg portion 133 and the table top assembly 102, defines an access opening 146.

The downwardly extending leg portion 122 of the front leg unit 120 as well as the downwardly extending leg portion 132 (also see FIG. 2) of the rear leg unit 130 are connected to the bottom of the table top assembly 102, and in particular to the bottom surface or to the side surfaces of the main table portion 105'. Similarly, the downwardly extending leg portion 124 of the front leg unit 120 as well as the downwardly extending leg portion 134 (also see FIG. 2) of the rear leg unit 130 are connected to the bottom of the table top assembly 102, and in particular to the bottom surface or to the side surfaces of the main table portion 105'. Other connection configurations are also possible. For example, the downwardly extending leg portions 124 and 134 can be connected to the bottom surface of the main table portion 105', while the downwardly extending leg portions 122 and 132 can be connected to the side surfaces of the main table portion 105'.

The transversely extending leg portion 126 connects the downwardly extending leg portion 122 to the downwardly extending leg portion 123. The transversely extending leg portion 128 connects the downwardly extending leg portion 123 with the downwardly extending leg portion 124. Similarly, the transversely extending leg portion 136 connects the downwardly extending leg portion 132 with the downwardly extending leg portion 133. Also, the transversely extending leg portion 138 connects the downwardly extending leg portion 133 with the downwardly extending leg portion 134 (see FIG. 2).

The above-mentioned segments of the leg unit 120 (i.e., downwardly extending leg portion 122, 123, and 124 and transversely extending leg portions 126 and 128) may be formed from a single piece of material, or formed as multiple segments that are connected together. Similarly, the above-mentioned segments of the rear leg unit 130 (i.e., downwardly extending leg portion 132, 133, and 134 (see FIG. 2) and transversely extending leg portions 136 and 138) may be formed from a single piece of material, or from multiple segments connected together.

The table saw assembly 100 further includes a panel 150. The panel 150 includes openings 152 and 154 (depicted with greater clarity in FIG. 2, and referenced therein) and an arc-shaped aperture 156 (see FIG. 2).

The table saw assembly 100 also includes bumpers 160, 162, and 164. The bumper 160 is secured to one lateral side 161 of the table top assembly 102. The bumper 162 is secured to the downwardly extending leg portion 123 and the transversely extending leg portion 128. The bumper 164 is secured to the downwardly extending leg portion 133 and the transversely extending leg portion 138. The bumpers 160, 162, and 164 are positioned so as to all intersect a plane, as will be discussed further below in reference to FIG. 6.

The table saw assembly 100 further includes handle units 180, 182. The handle units 180, 182 respectively include extension elements 180A and 182A extend from the support arrangement 101 and which define extension spaces 180B and 182B. The handle units 180 and 182 are fastened to the downwardly extending leg portions 123 and 124 of the front leg unit 120 and to the downwardly extending leg portions 133 and 134 of the rear leg unit 130 (e.g., welded or screwed). The handle unit 180 defines a closed loop form and includes a linearly extending handle portion 184. The linearly extending handle portion 184 is positioned adjacent to both the transversely extending leg portions 126 and 136 (see, e.g., FIG. 3). A protection zone 180AB is defined between the extension spaces 180B and 182B. The extension spaces 180B and 182B are configured such that certain actuators (e.g., the height adjustment wheel 198, referenced in FIG. 2) are completely contained within the protection zone 180AB.

A hand grip 186 (see FIG. 1) is attached to and surrounds the linearly extending handle portion 184. The handle units 180 and 182 are more clearly depicted in FIG. 10, with reference to which the handle units 180 and 182 are further described to include tubular handle structures.

The table saw assembly 100 includes components, e.g., the motor 112, which have large concentrations of mass. The location of these mass concentrations may cause difficulty when lifting and transferring the table saw assembly 100 by a worker from one location to another location. The hand grip 186 is positioned so that it is substantially aligned with a center of mass of the table saw assembly 100 from a carrying perspective, as further described below in reference to FIG. 9.

The front leg unit 120 also defines a leg opening 190. The leg opening 190 is defined by an interior surface of the front leg unit 120. The handle units 180 and 182 extend through the leg opening 190.

Figure 1A:
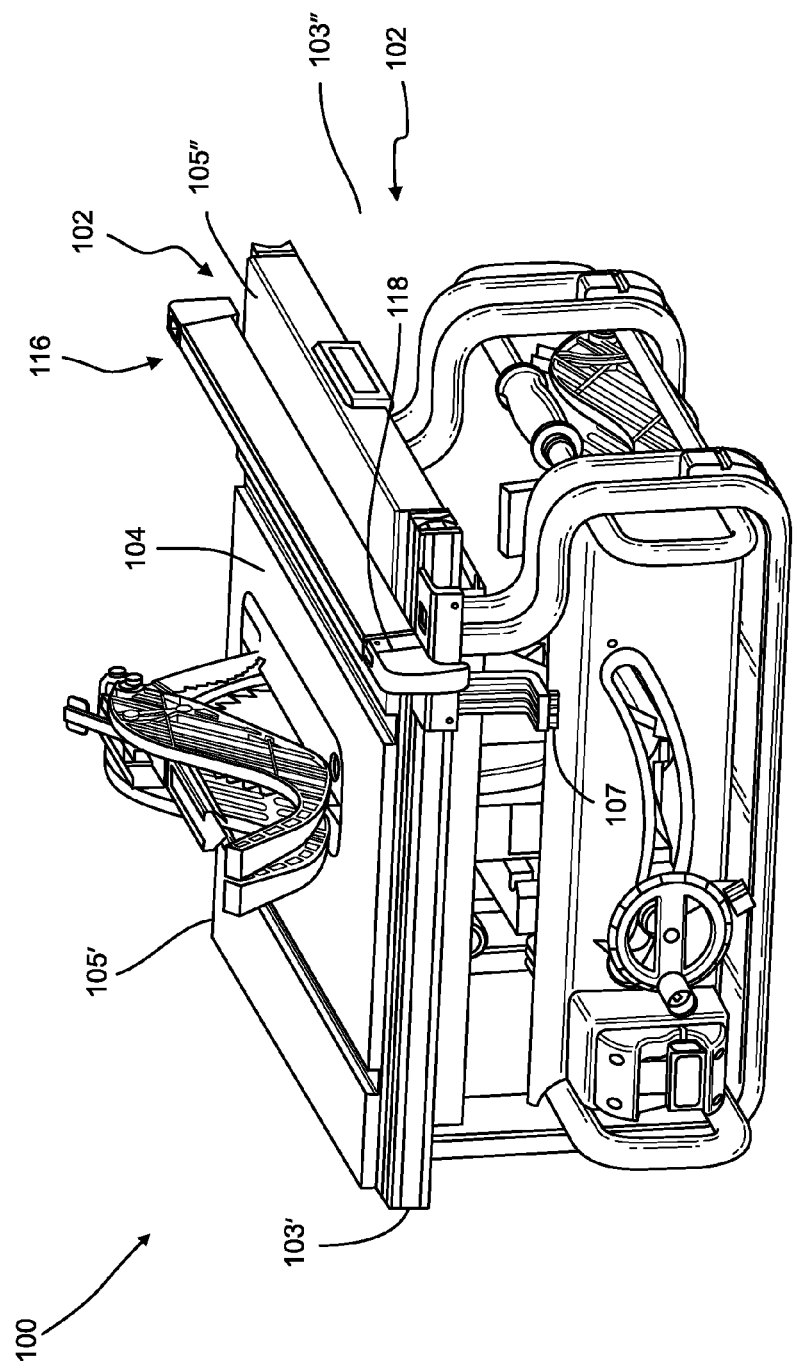
FIG. 1A is the same view as FIG. 1, except showing a rip fence above its work piece support surface positioned in an operative position.

Referring to FIG. 1A, a perspective view of the table saw assembly 100 is depicted. In FIG. 1A a rip fence 116 is shown positioned above the work piece support surface 104. The position of the rip fence 116 depicted in FIG. 1A is hereinafter referred to as the "operative position." The rip fence 116 is tightly coupled to the rails 103' and 103" and is lockable in a desired position by a locking handle 118, as is well known to one skilled in the art. The rip fence 116 is further described in a U.S. Pat. No. 6,460,442 Talesky et al. which is incorporated herein by reference, in its entirety. Since the extension table portion 105" of the table top assembly 102 is coupled and positioned between the rails 103' and 103", the rip fence 116 may be positioned over the extension table portion 105" or the main portion 105'.

Figure 1B:
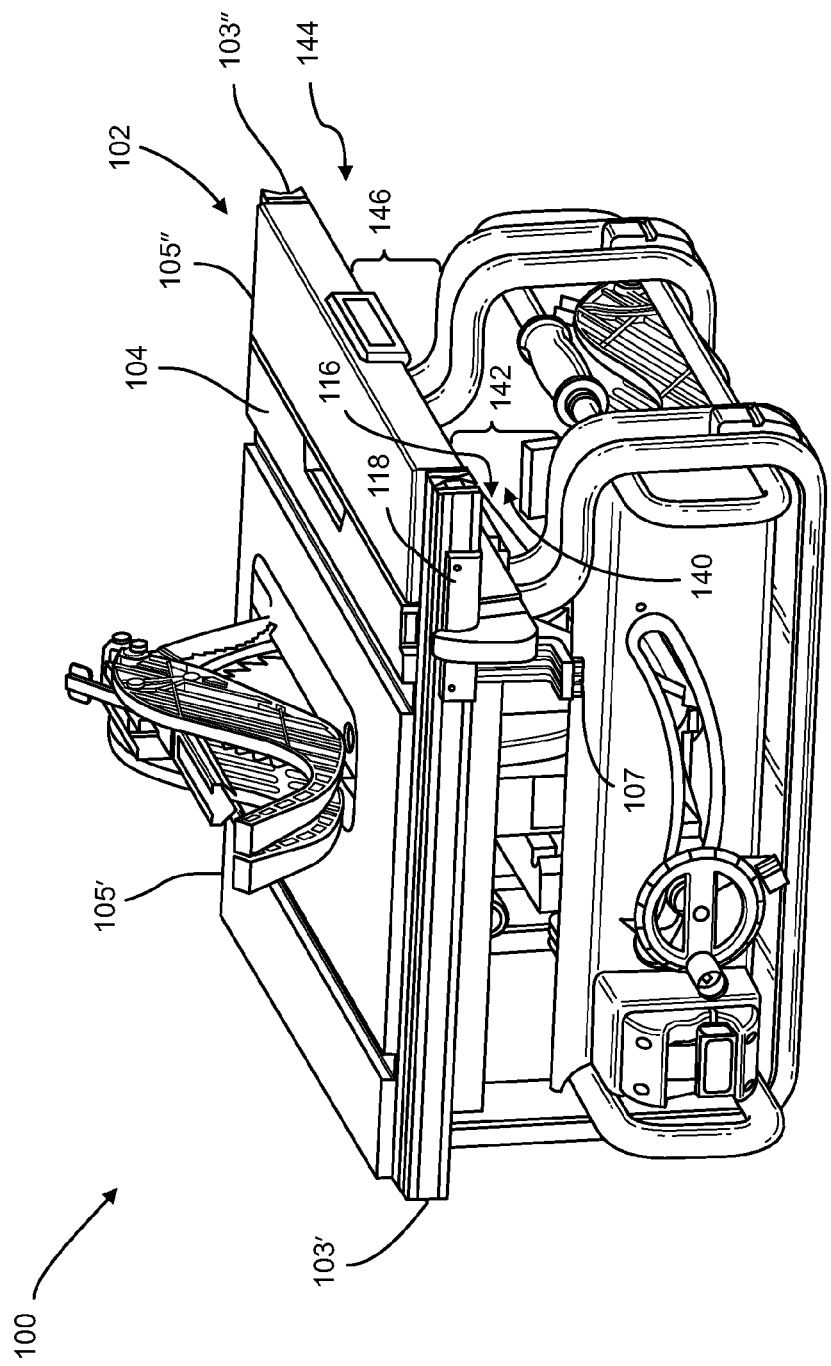
FIG. 1B is the same view as FIG. 1, except showing the rip fence below its work piece support surface positioned in a stowed position.

Referring to FIG. 1B, the rip fence 116 is shown placed in a stowed position below the work piece support surface 104. The rails 103' and 103" are symmetric. Therefore, the rip fence 116 is flipped and advanced through the access openings 142 and 146 when the rip fence 116 is moved from its operative position to its "stowed position." In the stowed position, the rip fence 116 is located in the storage spaces 140 and 144. The symmetric rails 103' and 103" are further described in a U.S. patent application Ser. No. 12/431,044 titled Table Saw with Symmetrical Rail Fence Storage Capability which is incorporated herein by reference, in its entirety. It should be appreciated that when the rip fence 116 is located in its storage position, the rip fence 116 is tightly coupled to the rails 103' and 103".

Referring to FIG. 2, a perspective view of the table saw assembly 100 is depicted. Details of the panel 150 are further depicted and referenced in FIG. 2. As described above, the panel 150 defines the openings 152 and 154 and the arc-shaped aperture 156. The handle units 180 and 182 extend through the openings 152 and 154, respectively.

The table saw assembly 100, depicted in FIG. 2, also includes bumpers 166, 168, and 170. The bumpers 162, 164, 168, and 170 are also referred to as foot bumpers as these are bumpers on which the saw assembly resets when the saw assembly 100 is in the position depicted in FIGS. 1 and 2. The bumpers 160 and 166 are also referred to as the hand bumpers as these are the bumpers that can provide comfort to a worker's hands as the worker grasps and picks up the saw assembly 100. The bumper 166 is secured to another lateral side 163 of the table top assembly 102. The bumper 168 is secured to the downwardly extending leg portion 124 and the transversely extending leg portion 128. The bumper 170 is secured to the downwardly extending leg portion 134 and the transversely extending leg portion 138. The bumpers 166, 168, and 170 are positioned so as to all intersect a plane, as will be discussed further below in reference to FIG. 7.

The rear leg unit 130 defines a leg opening 192. The leg opening 192 is defined by an interior surface of the rear leg unit 130. The handle units 180 and 182 also extend through the leg opening 192 (see also FIG. 3).

The adjustment mechanism 200 is also depicted in FIG. 2. The height adjustment wheel handle 199 is coupled to the height adjustment wheel 198 and is configured to rotate with respect to the height adjustment wheel 198 in a manner well known to one of ordinary skill in the art. A portion of the adjustment mechanism 200, further described below and particularly depicted and referenced to FIG. 17, extends through the arc-shaped aperture 156.

Also depicted in FIG. 2 is a blade guard 216 located in an operative position above the work piece support surface 104. In the operative position, the blade guard is connected to a riving knife 220 which is configured to move with the blade 110. A portion of the blade guard 216 is visible through the arc-shaped aperture 156 in FIG. 2, as the blade guard 216 is position in a stowed position (as more clearly shown in FIG. 3). The purpose and configuration of the riving knife 220 is well known to one of ordinary skill in the art. The blade guard 216 surrounds the blade 110 in a manner well known to one of ordinary skill in the art. The blade guard 216 may also be positioned below the work piece support surface 104 in a stowed position, as further described below with reference to FIGS. 12A and 12B.

Figure 3:
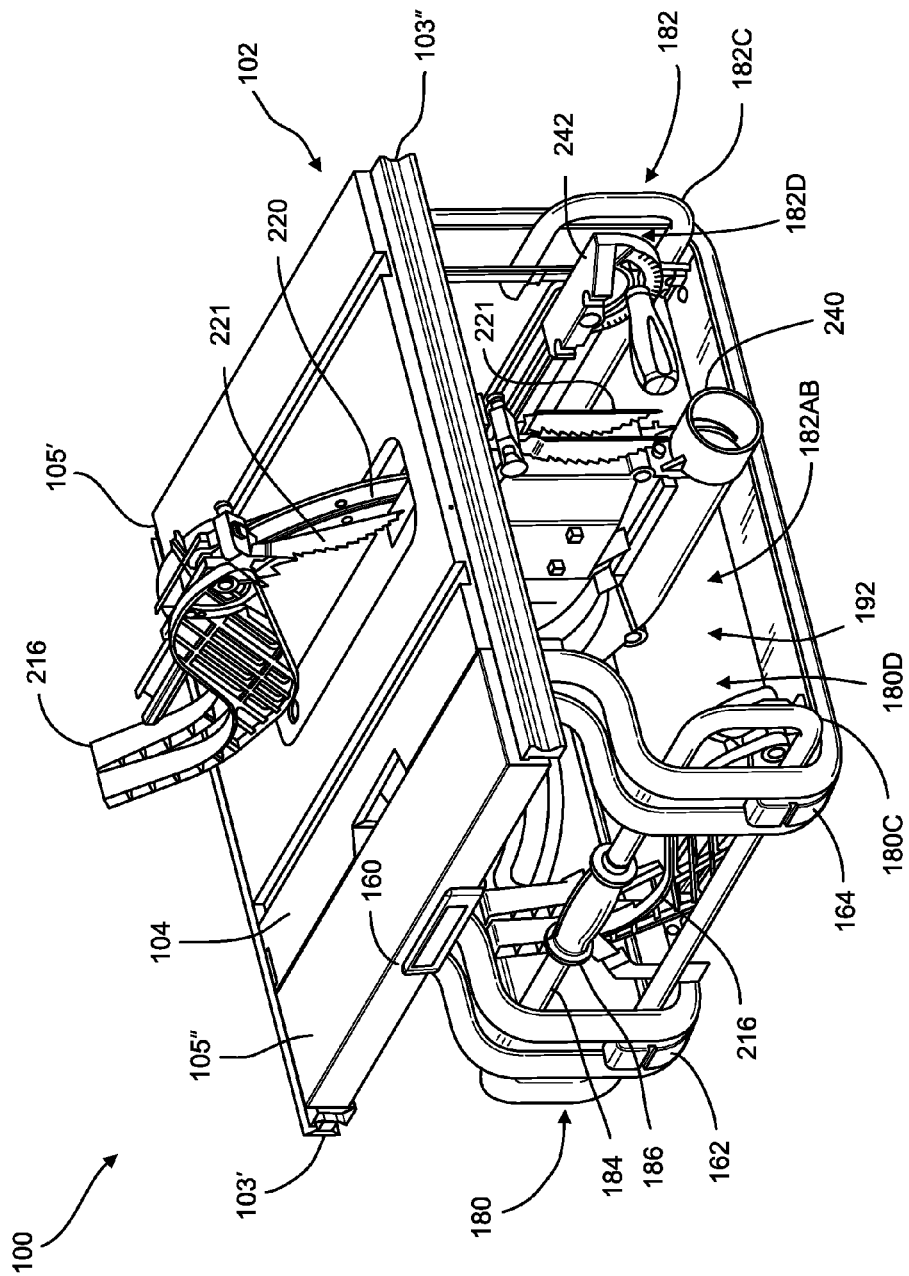
FIG. 3 depicts yet another perspective view of the table saw assembly of FIG. 1.

Further depicted in FIG. 2 is an anti-kick back device 221 positioned in an operative position above the work piece support surface 104. The anti-kick back device 221 is also connected to the riving knife 220. The anti-kick back device 221 may also be stowed under the work piece support surface 104 (as shown in FIG. 3). The purpose and configuration of the anti-kick back device 221 is well known to one of ordinary skill in the art.

Also depicted in FIG. 2 is a power switch assembly 230 attached to the panel 150. The power switch assembly 230 is configured to selectively enable and disable electrical power to the table saw assembly 100 by toggling an actuator 232, as further described and referenced in FIGS. 16A and 16B.

Referring to FIG. 3, the blade guard 216 is depicted in the operative position and in the stowed position with more clarity. Also, the anti-kick back device 221 is depicted in the operative position and the stowed position with additional clarity. Obviously, these components can only be positioned in either operative or stowed position at an instant in time, but these are shown in both positions for convenience of description.

Further depicted in FIG. 3 is a dust discharge outlet 240. The dust discharge outlet 240 provides a channel for saw dust to be collected in a dust bag (not shown) or by a vacuum system (not shown) that is coupled to the dust discharge outlet 240, as is well known to one of ordinary skill in the art.

Also depicted in FIG. 3 is a miter gauge 242 shown in a stowed position. The miter gauge 242 is used for making precise miter cuts in a workpiece, as is well known to one of ordinary skill in the art.

The handle units 180, 182 further respectively include extension elements 180C and 182C extending from the support arrangement 101 and which define extension spaces 180D and 182D. A protection zone 182AB is defined between the extension spaces 180C and 182C. The extension spaces 180C and 182C are configured such that the certain components (e.g., the dust discharge outlet 240) are located in the protection zone 182AB.

Figure 4:
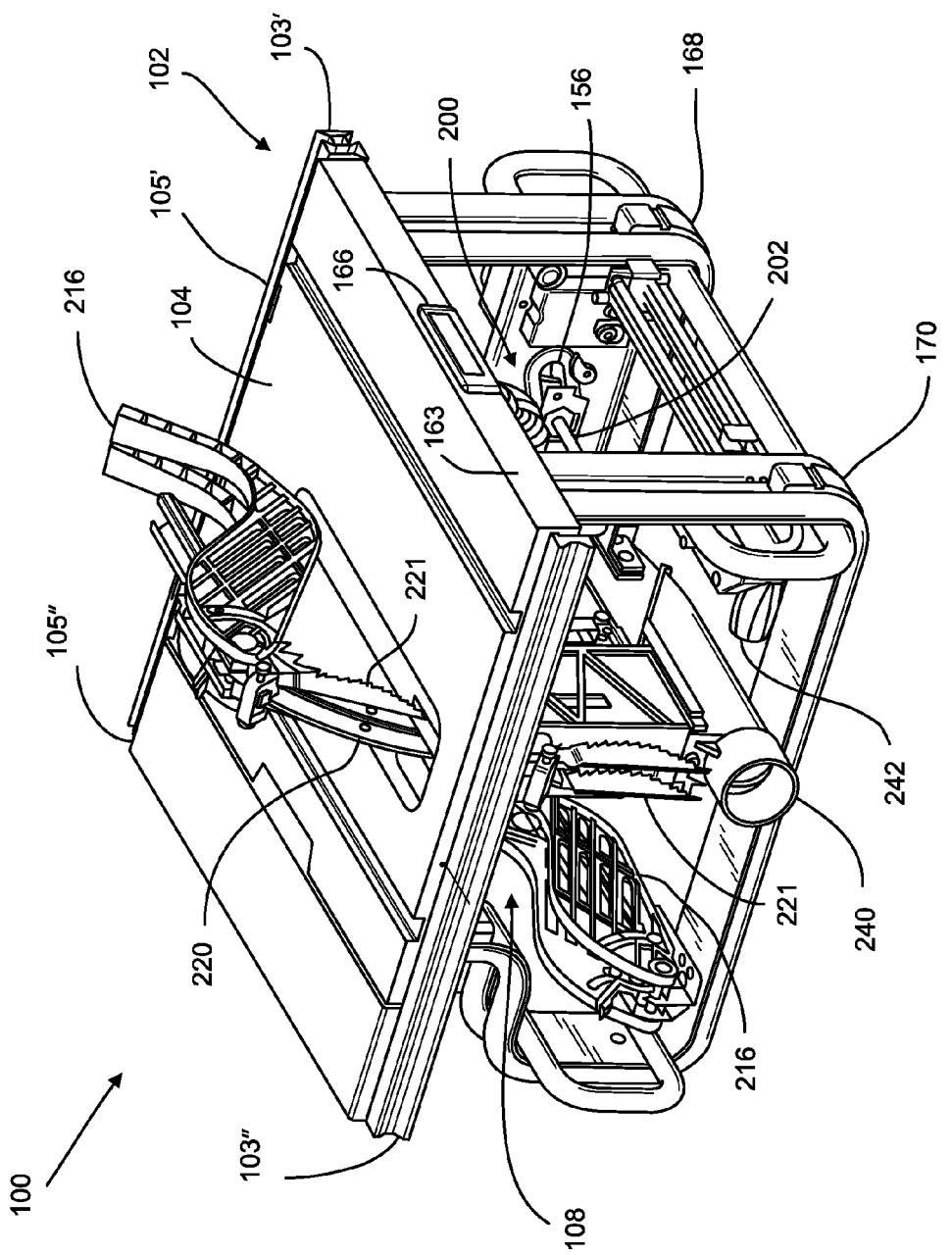
FIG. 4 depicts still another perspective view of the table saw assembly of FIG. 1.
Figure 17:
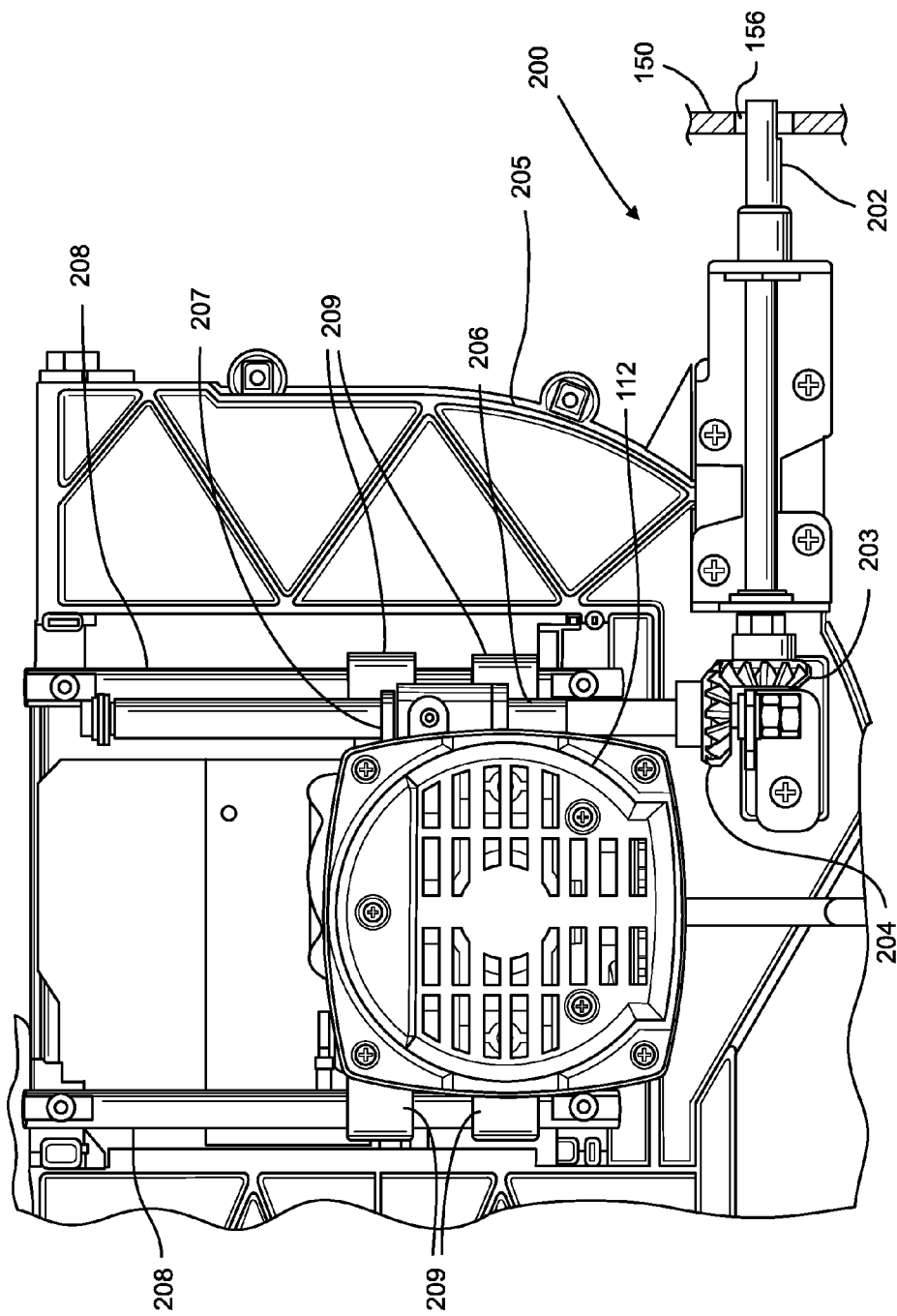
FIG. 17 depicts a side elevation view of the adjustment mechanism of the table saw assembly of FIG. 1 showing a set of bevel gears and one of them connected to an outwardly threaded screw member for raising and lowering the motor assembly.

Referring to FIG. 4, a perspective view of the table saw assembly 100 is depicted. In FIG. 4, the portion of the adjustment mechanism, particularly a shaft 202, further described below with reference to FIG. 17, is depicted with added clarity extending through the arc-shaped aperture 156.

Figure 5:
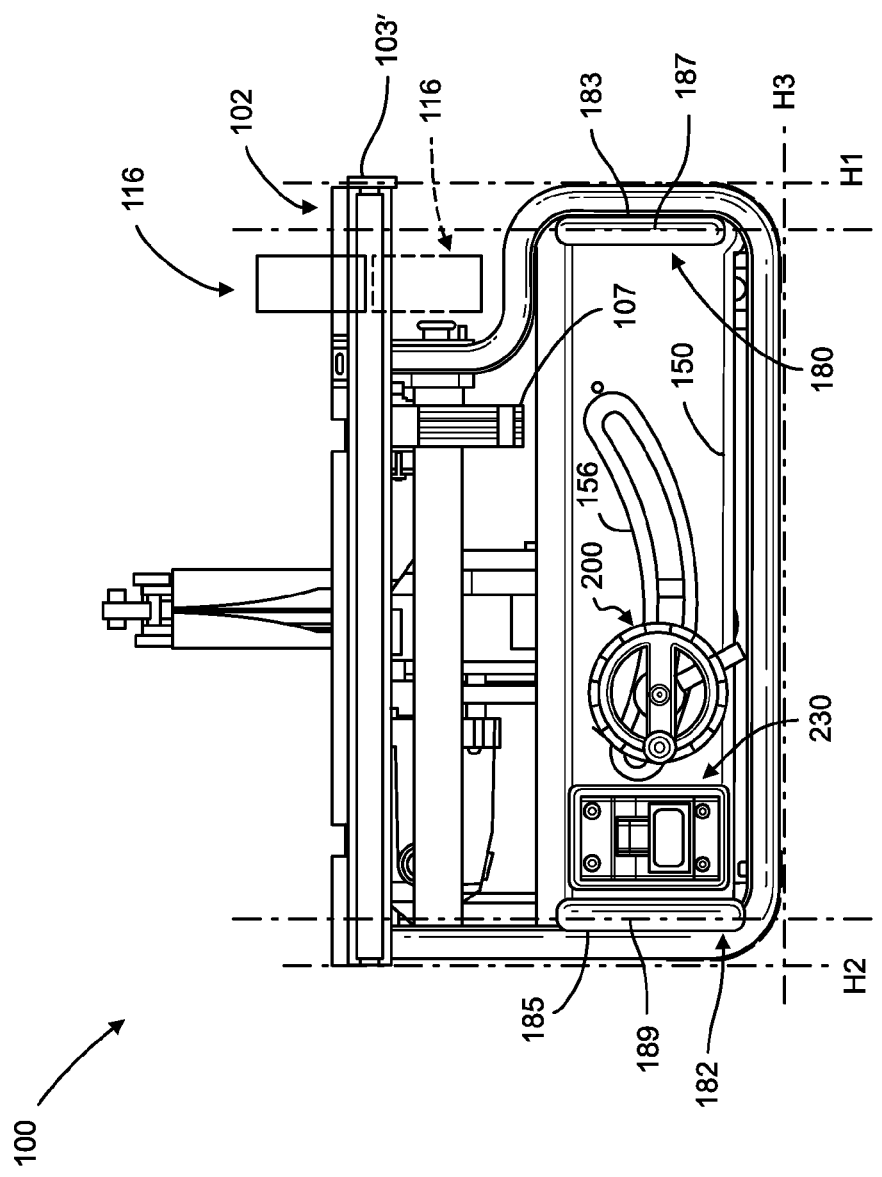
FIG. 5 depicts a front elevation view of the table saw assembly of FIG. 1 showing vertical extending portions of the handle units each defining a linear front face.

Referring to FIG. 5, a front elevation view of the table saw assembly 100 is depicted. The rip fence 116 is depicted in both the operative position (solid lines) as well as the stowed position (phantom lines).

Also depicted in FIG. 5 are lines L1 and L2 defined by vertically extending portions 183 and 185 of the handle units 180 and 182, respectively. The vertically extending portion 183 defines a linear front surface 187, while the vertically extending portion 185 defines a linear front surface 189. The linear front surfaces 187 and 189 define a plane P, as further described and referenced with respect to the power switch assembly 230 in reference with FIGS. 16A and 16B.

Also depicted in FIG. 5 are planes referenced by H1, H2, and H3. These planes represent surfaces on which the table saw assembly 100 may rest on. For example, the plane H3 represents a floor surface (e.g., a garage floor) on which the table saw assembly 100 may rest according to the position depicted in FIG. 5.

Figure 6:
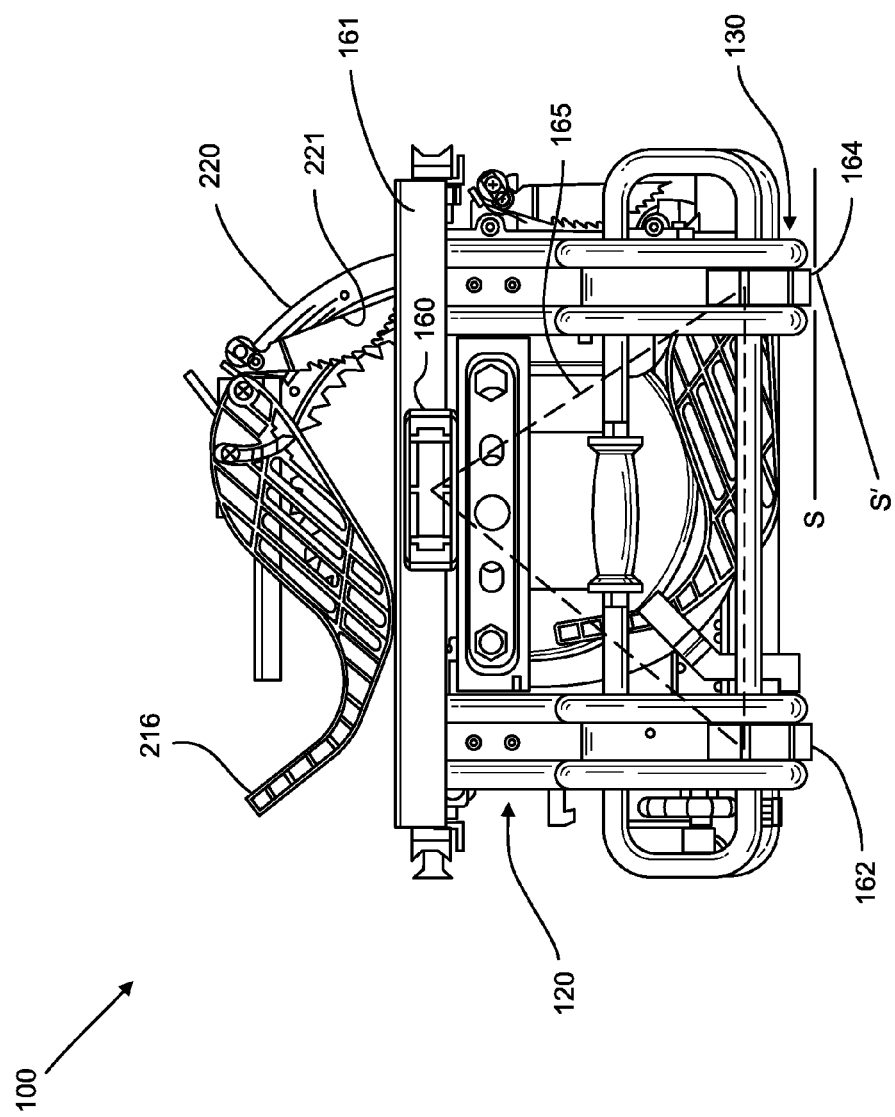
FIG. 6 depicts a side elevation view of the first side of the table saw assembly of FIG. 1 showing one of the handle units forming a loop and a hand grip disposed on a linearly extending handle portion.

Referring to FIG. 6, a right side elevation view of the table saw assembly 100 is depicted. As described above, the bumpers 160, 162, and 164 are positioned so as to all intersect a plane 165. Therefore, the table saw assembly 100 may be placed on the side depicted in FIG. 6 so that each of the bumpers 160, 162, and 164 contact a support surface such as a floor in a garage. So oriented, the bumpers 160, 162, and 164 protect the table top assembly 102 and the leg units 120 and 130 from damages such as scratches.

Further, bumpers 162 and 164 are configured such that by tilting the saw assembly 100 the leg units 120 and 130, and in particular the respective tubes 274 and 262 of the leg units 120 and 130, can make contact with the surface on which the saw assembly 100 is supported, e.g., the bed of a pickup truck. This feature allows the saw assembly 100 to more freely move (i.e., with less friction). Two plans S and S' are depicted in FIG. 6 indicating how the saw assembly can be tilted.

Figure 7:
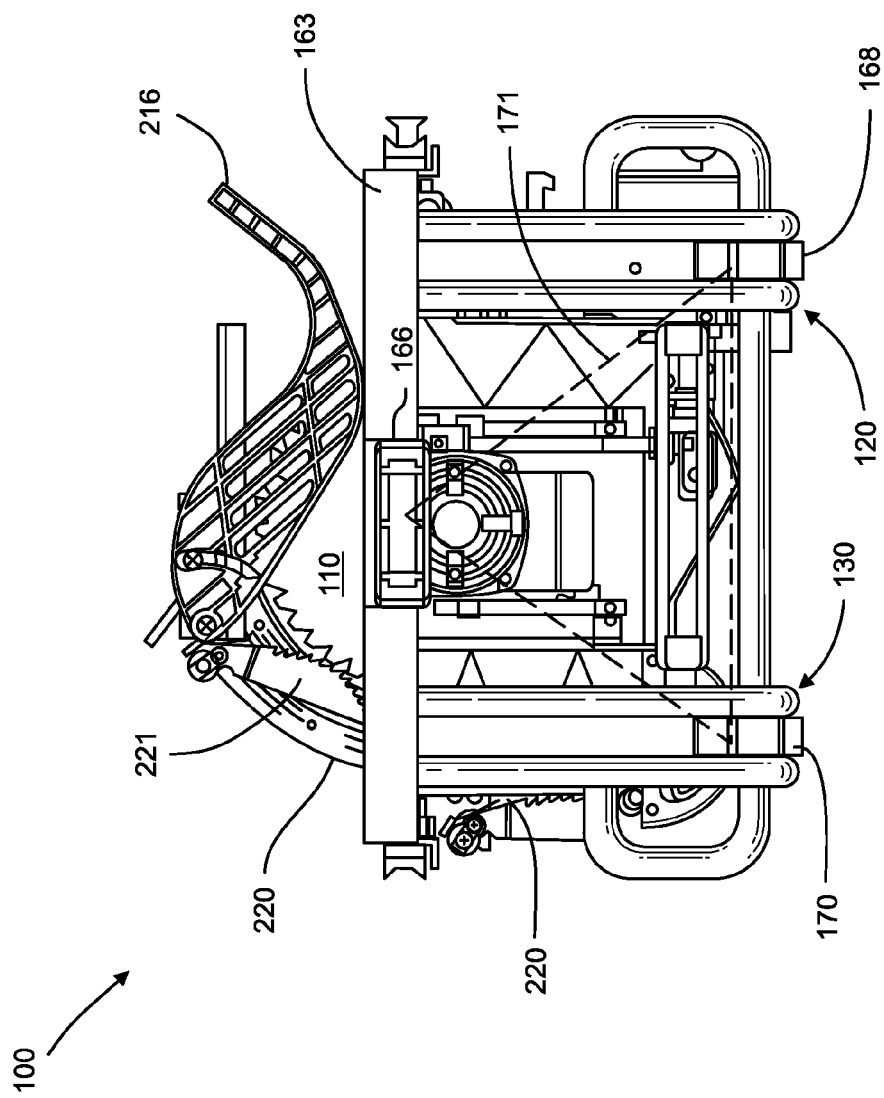
FIG. 7 depicts another side elevation view of the table saw assembly of FIG. 1 showing the motor assembly and partially showing a height adjustment of the adjustment mechanism.

Referring to FIG. 7, a left side elevation view of the table saw assembly 100 is depicted. As described above, the bumpers 166, 168, and 170 are positioned so as to all intersect a plane 171. Therefore, the table saw assembly 100 may be placed on the side depicted in FIG. 7 so that each of the bumpers 166, 168, and 170 contact a support surface such as a floor in a garage. So oriented, the bumpers 166, 168, and 170 protect the table top assembly 102 and the leg units 120 and 130 from damages such as scratches. The planes 165 (shown in FIG. 6) and 175 are parallel to each other.

Figure 8:
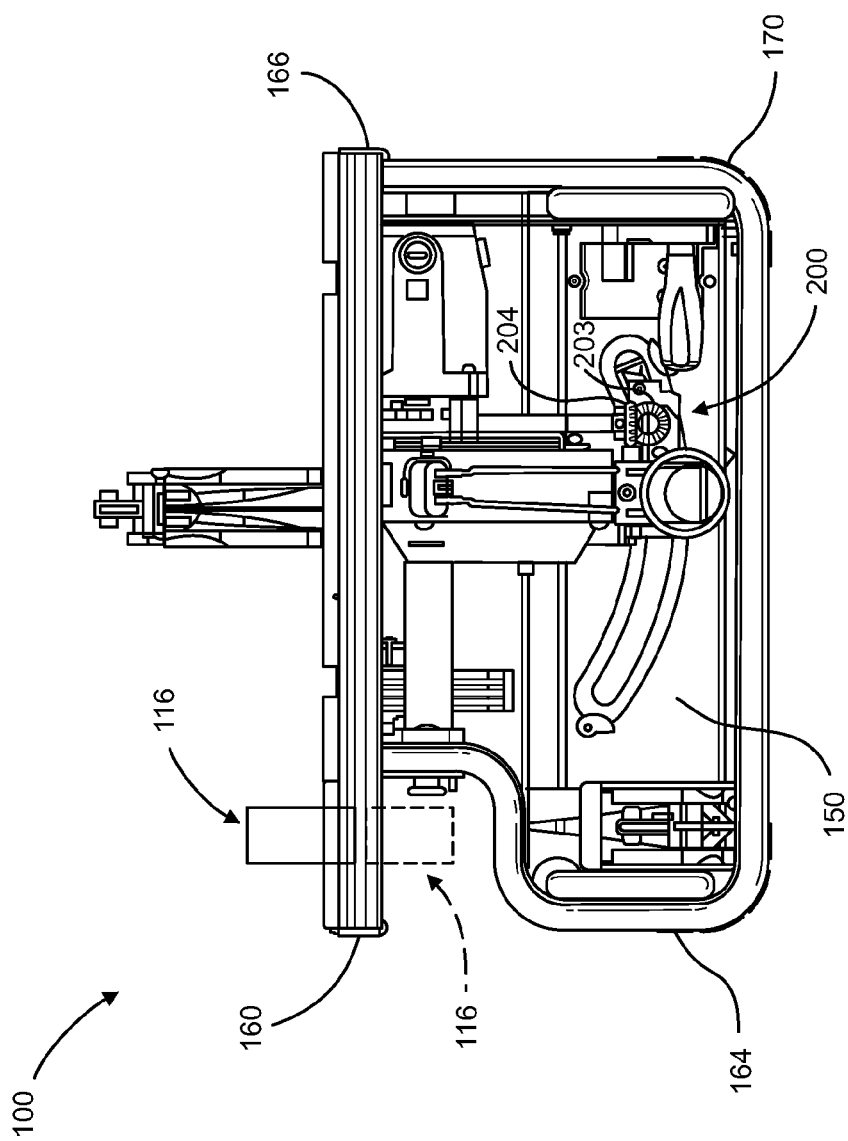
FIG. 8 depicts a rear elevation view of the table saw assembly of FIG. 1 showing an aperture in the panel and further details of the height adjustment mechanism.

Referring to FIG. 8, a rear elevation view of the table saw assembly 100 is depicted. The rip fence 116 is depicted in both the operative position (solid lines) as well as the stowed position (phantom lines). Additional details of the adjustment mechanism 200 are also depicted in FIG. 8. In particular, bevel gears 203 and 204 are depicted in front of the arc-shaped aperture 156. Further details of the bevel gears 203 and 204 are set forth with reference to FIG. 17.

Figure 9:
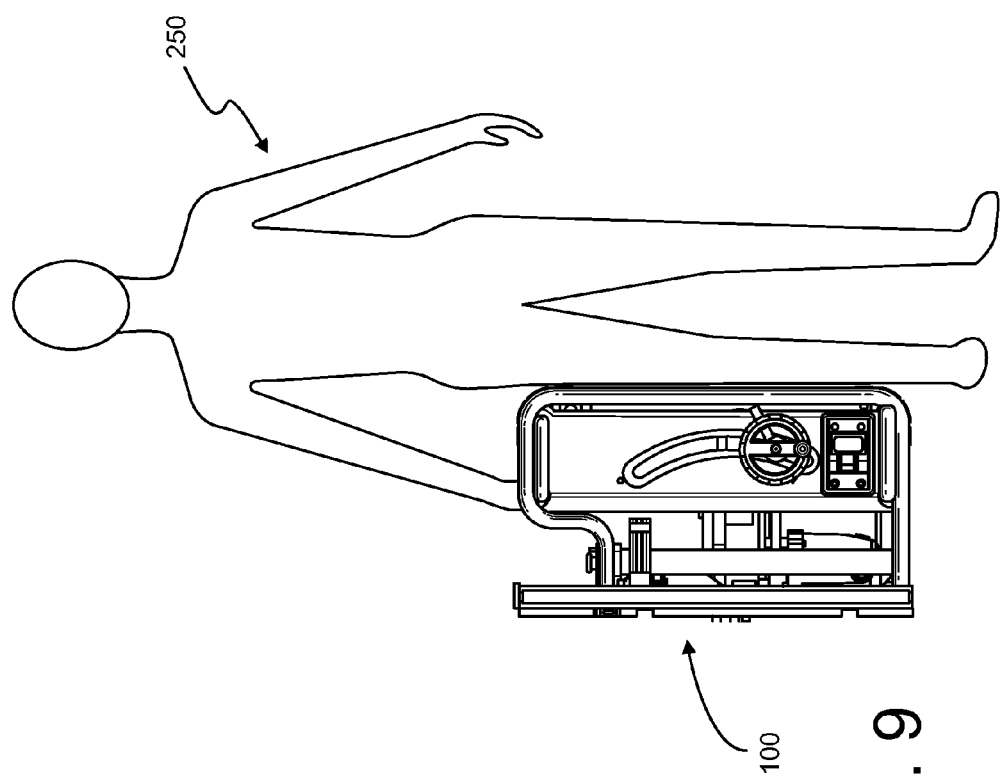
FIG. 9 depicts a schematic view of an operator lifting and carrying the table saw assembly of FIG. 1.

Referring to FIG. 9, the table saw assembly 100 is depicted being transported by a worker 250. The worker 250 can grasp the hand grip 186 (see also FIG. 1) and lift the entire table saw assembly 100. As described above, the hand grip 186 is positioned with respect to the table saw assembly 100 in a manner which allows the act of transporting the table saw assembly 100 to be less cumbersome. In particular, the hand grip 186 is positioned to be substantially aligned with mass concentrations, e.g., mass of the motor 112, such that the work piece support surface 104 remains perpendicular to ground while the table assembly 100 is carried by the user 250. A user also could carry the saw assembly 100 with two hands by the handle units 180 and 182.

In an alternative embodiment, the hand grip 186 can be rotatably mounted along an axis defined by the linearly extending handle portion 184 (see FIG. 1). The rotational movement of the hand grip is configured such that when a worker grasps the hand grip 186 to pick up the table saw assembly 100, the hand grip 186 rotates with respect to the table saw assembly 100 to thereby hang freely. This rotational movement of the hand grip 186 substantially reduces a torque that may otherwise be applied to the worker's arm.

Figure 10:
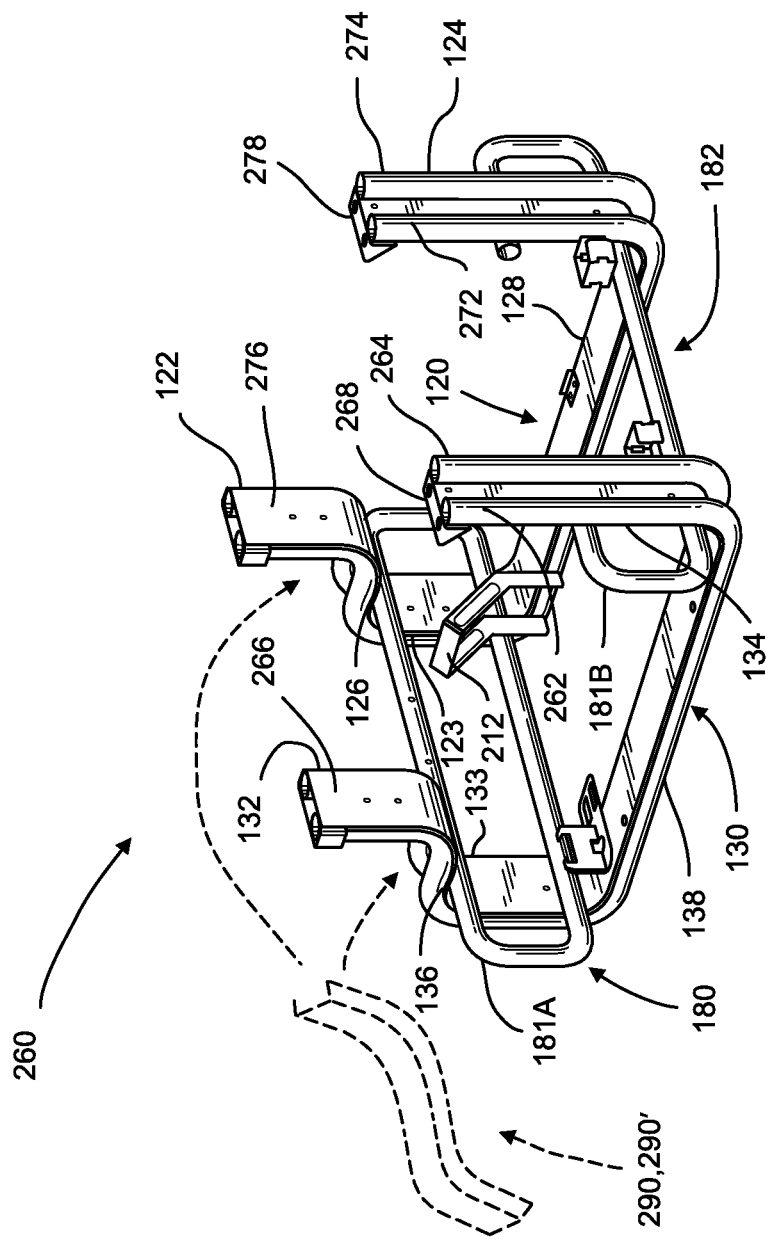
FIG. 10 depicts a perspective view of the leg units of the table assembly of FIG. 1.

Referring to FIG. 10, a perspective view of the leg units 120 and 130 and the handle units 180 and 182 are depicted. The handle units 180 and 182 are formed by tubular handle structures 181A and 181B, respectively. The front leg unit 120 includes tubes 272 and 274 that are spaced apart from each other. The tubes 272 and 274 are coupled to each other by a web 276. A coupling bracket 278 is also depicted in FIG. 10 for coupling the front leg unit 120 to the bottom side of the table top assembly 102.

Also, as depicted in FIG. 10, the rear leg unit 130 includes tubes 262 and 264 spaced apart from each other. The tubes 262 and 264 are coupled to each other by a web 266. A coupling bracket 268 is also depicted in FIG. 10 for coupling the rear leg unit 130 to the bottom side of the table top assembly 102.

A clamp 212 is also depicted in FIG. 10. The clamp 212 is configured to receive the blade guard 210 in the stowed position, as further described below and depicted with reference to FIGS. 12A and 12B.

Also depicted in FIG. 10 (in phantom) is a metallic reinforcement insert 290. The metallic reinforcement insert 290 is interposed between the tubes 262 and 264. The metallic reinforcement insert 290 is further configured to be connected to the downwardly extending leg portion 122, the transversely extending leg portion 126, and the downwardly extending leg portion 123. The metallic reinforcement insert 290 is configured to provide additional structural strength to the front leg unit 120.

Another metallic reinforcement insert 290' is interposed between the tubes 272 and 274 in a similar manner as described above with respect to the tubes 262 and 264. Similarly, the metallic reinforcement insert 290' is connected to the downwardly extending leg portion 132, the transversely extending leg portion 136, and the downwardly extending leg portion 133. The metallic reinforcement insert 290' is configured to provide additional structural strength to the rear leg unit 130.

Figure 11A:
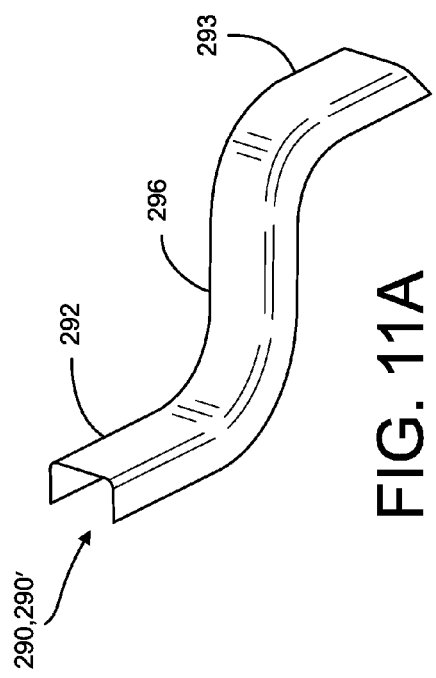
FIG. 11A depicts a perspective view of a metallic reinforcement insert of the leg units of FIG. 10.
Figure 11B:
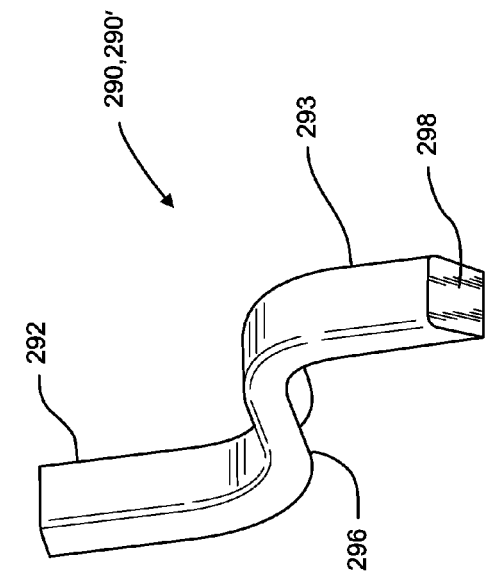
FIG. 11B depicts another perspective view of the metallic reinforcement insert of FIG. 11A showing two vertically extending portions and a transversely extending configured to be position on vertically and transversely extending portions of the leg units.

Referring to FIGS. 11A and 11B, perspective views of the metallic reinforcement inserts 290 and 290' are depicted. The metallic reinforcement inserts 290 and 290' include downwardly extending portions 292 and 293 and a transversely extending portion 296.

Figure 11C:
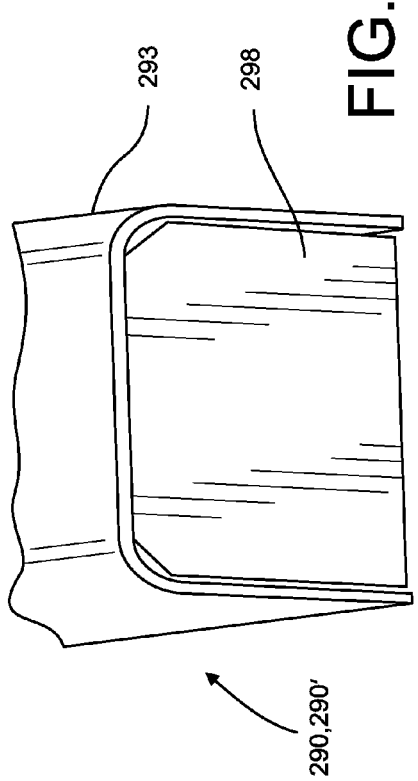
FIG. 11C depicts a fragmentary perspective view of the metallic reinforcement insert of FIG. 11B showing an end cap that is configured to prevent dust accumulation within the metallic reinforcement insert.

The metallic reinforcement inserts 290 and 290' also include a dust cap 298 positioned at one end, as depicted in FIG. 11C. The dust cap 298 is configured to prevent dust collecting within the metallic reinforcement inserts 290 and 290'. Since the other end of the metallic reinforcement inserts 290 and 290' is coupled to the bottom side of the table top assembly 102, no dust cap is provided on that end, although, alternatively one may be provided if desired.

Referring to FIGS. 12A and 12B, a blade guard 526 is depicted in a stowed position within an alternative embodiment of a table saw assembly 400. The table saw assembly 400 is similar to the table saw assembly 100, but includes different features further described below with respect to FIGS. 19 and 20. The blade guard 526 is similar to the blade guard 216 and is similarly configured to be placed in the stowed position by clamps 512 and 514. The clamp 512 is similar to the clamp 212, depicted in FIG. 10. The clamps 512 and 514 are configured to receive opposite ends of the blade guard 510 in the stowed position, as depicted in FIG. 12B. The blade guard 526 is connected to a riving knife 520 (shown in FIG. 12B) when the blade guard is in an operative position.

Figure 13A:
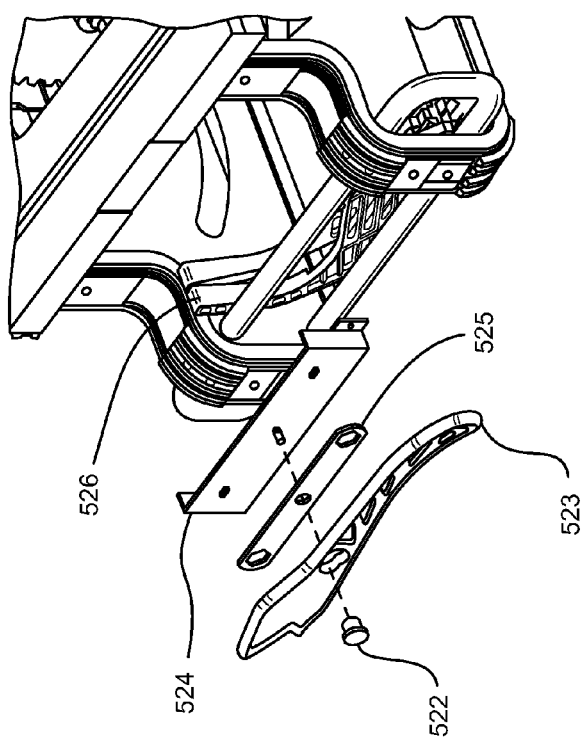
FIG. 13A depicts a perspective view of the table saw of FIG. 12B showing a subassembly for stowing a push stick and a wrench.
Figure 13B:
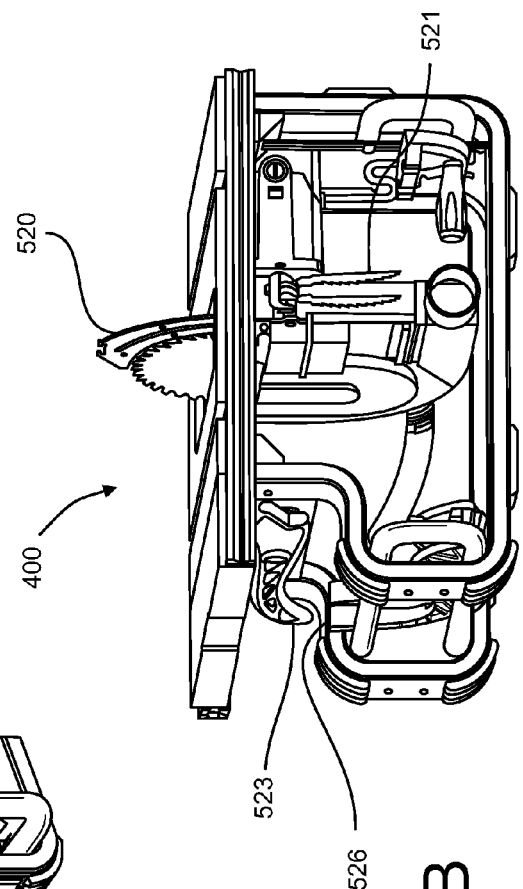
FIG. 13B depicts a perspective view of the table saw of FIG. 12B showing the push stick, the blade guard, the anti-kick back device, and the miter gauge in the stowed position.

Referring to FIGS. 13A and 13B, a push stick 523 is depicted in a stowed position within the table saw assembly 400. The push stick 523 is configured to be placed in the stowed position by a fastener 522 and a bracket 524. Also depicted in FIG. 13A is a wrench 525 that may be placed in the stowed position between the push stick 523 and the bracket 524.

Figure 14:
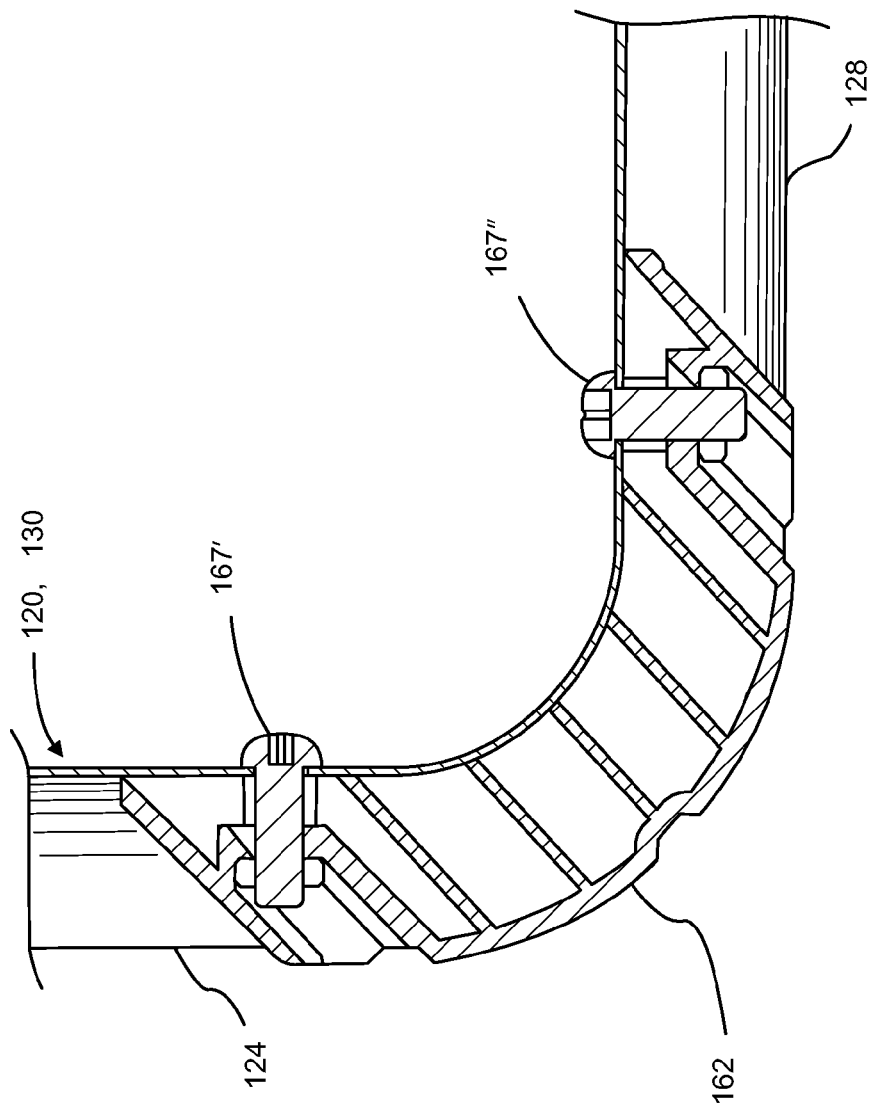
FIG. 14 depicts a cross sectional view of one of the leg units of FIG. 1 with one of the bumpers fastened to the leg unit.

Referring to FIG. 14, the coupling between the front leg unit 120 (or 130) and one of the bumpers 162, 164, 168, or 170 is depicted with added clarity. The exemplary bumper 162 is coupled to the front leg unit 120 (or 130) with fasteners 167' and 167". The exemplary bumper 142 is connected to both the downwardly extending leg portion 124 and transversely extending leg portion 128.

Referring to FIGS. 15A and 15B, perspective views of one of the bumpers 162, 164, 168, or 170 are depicted, however, only the bumper 162 will be discussed below. The bumper 162 includes mounting holes 169' and 169" wherethrough the fasteners 167' and 167" extend to fasten the bumper 162 to the front leg unit 120.

Figure 16A:
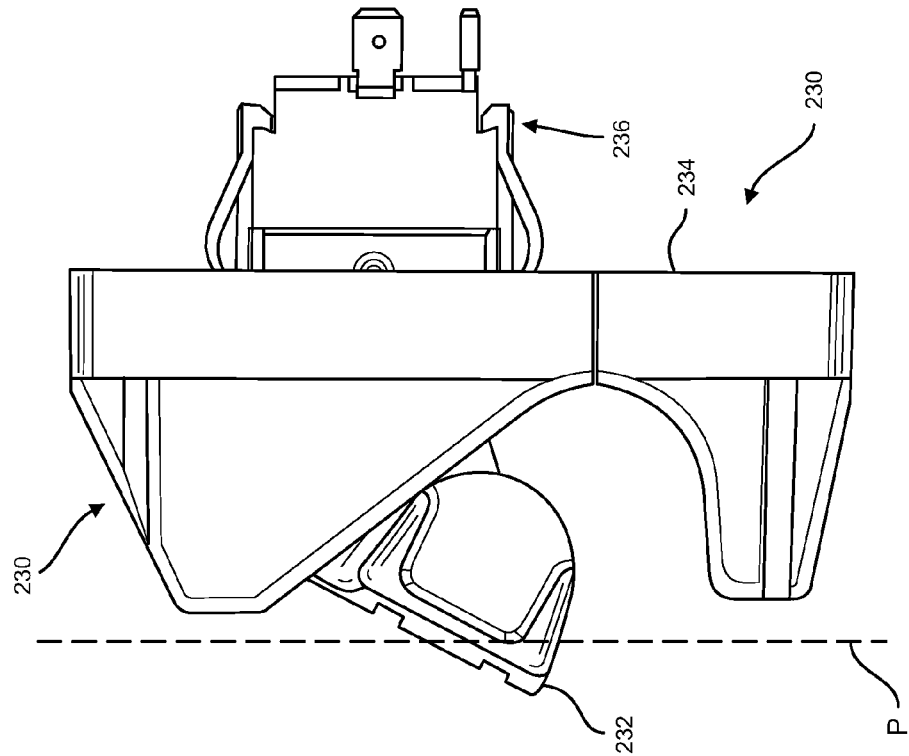
FIG. 16A depicts a side view of a power switch assembly of the table saw assembly of FIG. 5 with a power switch having an actuator shown in an "off" position and located completely on one side of a plane defined by the vertical extending portions.
Figure 16B:
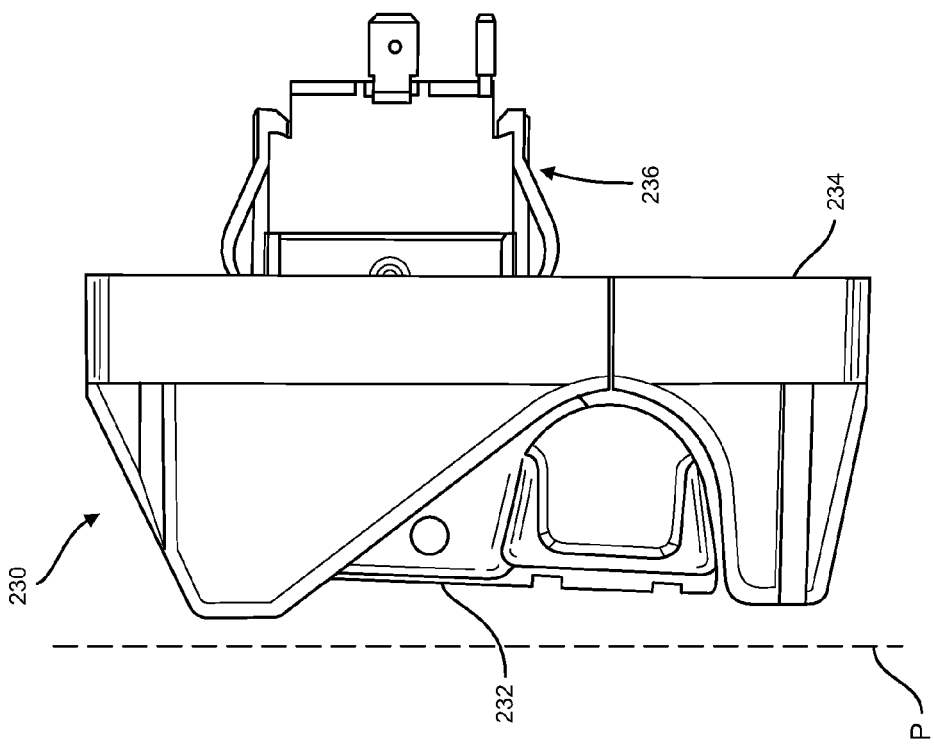
FIG. 16B is a view similar to FIG. 16A with the actuator shown in an "on" position and extending through the plane defined by the vertical extending portions.

Referring to FIGS. 16A and 16B, the power switch assembly 230 is depicted. The power switch assembly 230 includes the actuator 232, an actuator housing 234 and a switch housing 236. The actuator 232 is depicted in the "off" position in FIG. 16A, while the actuator 232 is depicted in the "on" position in FIG. 16B. As depicted in these figures, the plane P defined by the linear front surfaces 187 and 189 is positioned adjacent the actuator 232. In the "off" position the actuator 232 is located on one side of the plane P. In the "on" position, the actuator 232 extends through the plane P.

Referring to FIG. 17, the adjustment mechanism 200 is depicted with additional detail. The adjustment mechanism 200 includes the shaft 202 which extends through the arc-shaped aperture 156 (see also FIG. 4), the bevel gears 203 and 204, a undercarriage 205, an exteriorly threaded screw member 206, an interiorly threaded nut member 207, guide rods 208, and guide collars 209. The shaft 202 is coupled to the height adjustment wheel 198, and is configured to rotate in response to rotation of the height adjustment wheel 198. The bevel gear 203 is coupled to the shaft 202 and is configured to rotate therewith. The bevel gear 204 is coupled to the bevel gear 203 and is configured to rotate in response to the rotation of the bevel gear 203 in a plane substantially perpendicular to the plane of rotation of the bevel gear 203.

The exteriorly threaded screw member 206 is coupled to the bevel gear 204 and is configured to rotate in response to the rotation of the bevel gear 204, and in the same plane of rotation. The exteriorly threaded screw member 206 is threadably engaged with the interiorly threaded nut member 207. The motor 112 is fixedly coupled to the interiorly threaded nut member 207 as well as the collars 209. The guide rods 208 are slidably disposed within the collars 209. Rotation of the height adjustment wheel 198 rotates the shaft 202, which rotates the bevel gear 203, and which also rotates the bevel gear 204. The exteriorly threaded screw member 206 rotates within the interiorly threaded nut member 207.

While not shown, the guide rods 208 are fixed with respect to the undercarriage 205. Since the motor 112 is fixedly coupled to the interiorly threaded nut member 207, rotation of the exteriorly threaded screw member 206 within the interiorly threaded nut member 207 causes the motor 112 and the blade 110 to raise and lower (on guide rods 208) with respect to the table top assembly 102. Therefore, rotating the height adjustment wheel 198, raises and lowers the motor 112 and the blade attached to the motor 112 with respect to the table top assembly 102.

Figure 17A:
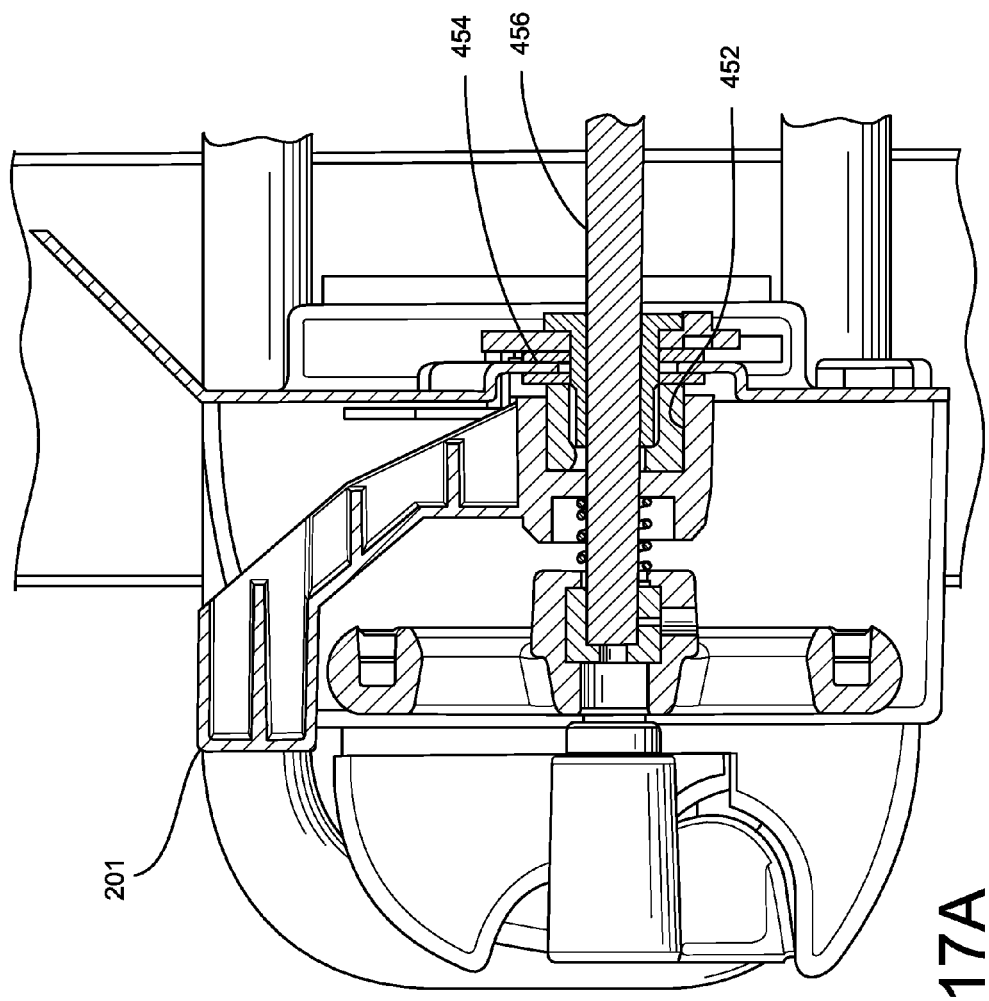
FIG. 17A depicts a side elevation of the adjustment mechanism of the table saw assembly of FIG. 1 showing mechanism of the bevel adjustment locking lever.

Referring to FIG. 17A a side view of the bevel adjustment locking lever 201 and other associated components is depicted. The bevel lock adjustment locking lever 201 is coupled to a nut 452 which is coupled to a fixed threaded bushing 456. A front plate 454 (which could be the panel 156) becomes in frictional contact with the front plate 454 and the nut 456 when the bevel adjustment locking lever 201 is placed in a locked position.

Figure 18:
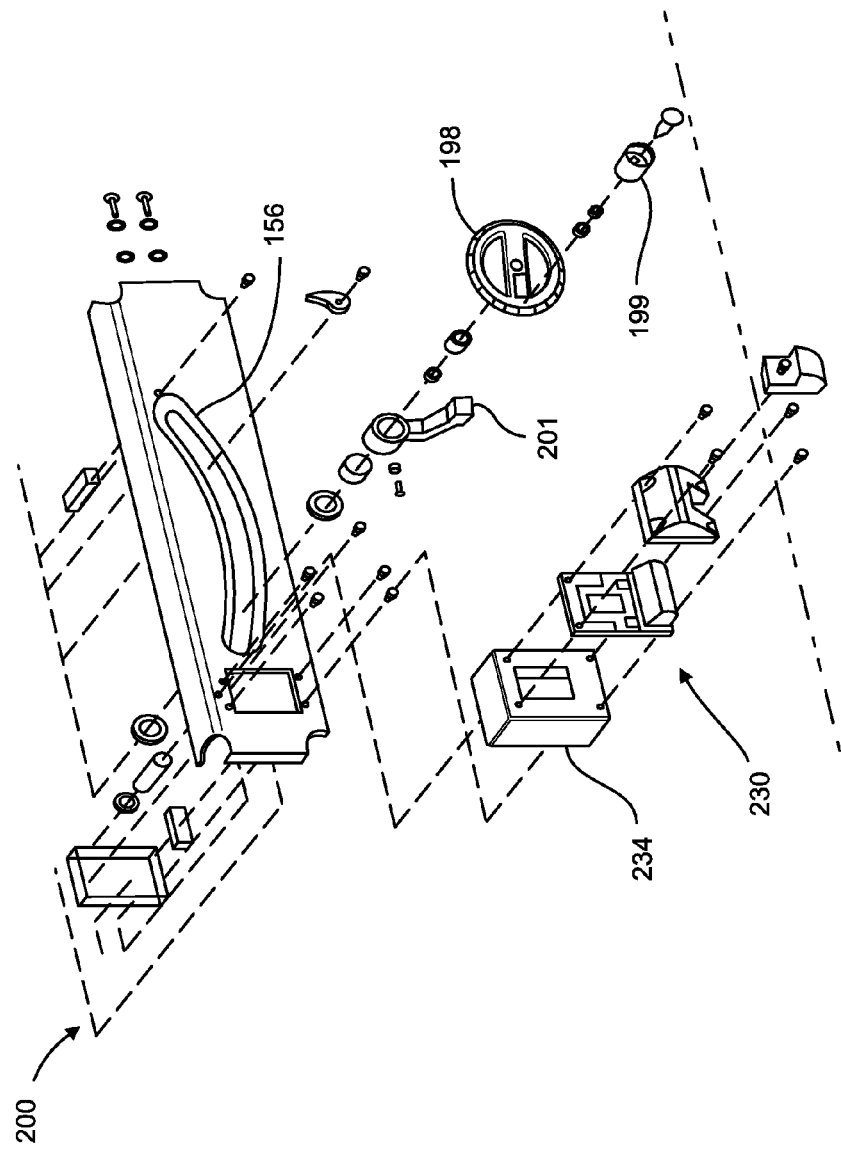
FIG. 18 depicts an exploded view of the adjustment mechanisms of FIG. 17 configured to provide both height and bevel adjustments of the table saw assembly.

In addition to vertical adjustment, the adjustment mechanism 200 is also configured to provide bevel adjustment. More specifically, the adjustment mechanism 200 is configured to cause the saw blade 410 to pivot about a pivot point in response to movement of the height adjustment wheel 498 within an arcuate opening 556, as is well known to one of ordinary skill in the art. Referring to FIG. 18, a fragmentary exploded view of the adjustment mechanism 200, in particular with respect to the bevel adjustment, is depicted. The bevel adjustment locking lever 201 (see FIG. 2) is coupled to adjustment mechanism 200 and to undercarriage 205 via shaft 202 and brackets. The bevel adjustment locking lever 201 of the adjustment mechanism 200 is configured to lock a bevel angle of the saw undercarriage assembly 108 with the motor 112 and blade 110 with respect to the table top assembly 102.

Referring to FIGS. 19 and 20 a perspective view and an elevation view of the table saw assembly 400 are depicted. Similar to the table saw assembly 100, the table assembly 400 includes a table top assembly 402. The table top assembly 402 includes rails 403' and 403", a main portion 405' and an extension portion 405". The main portion 405' and the extension portion 405" define a work piece support surface 404.

The table saw assembly 400 further includes leg units 420 and 430. The leg unit 420 includes downwardly extending leg portions 422, 423, and 424. The leg unit 420 also includes transversely extending leg portions 426 and 428. The leg unit 430 includes downwardly extending leg portions 432, 433, and 434. Similarly, the leg unit 430 also includes transversely extending leg portions 436 and 438.

The table saw assembly 400 also includes bumpers 460, 461, 462, and 464. The bumpers 460 and 461 are each secured to the downwardly extending leg portions 422 and 432, respectively. The bumper 462 is secured to the downwardly extending leg portion 423 and the transversely extending leg portion 428. The bumper 464 is secured to the downwardly extending leg portion 433 and the transversely extending leg portion 438. The bumpers 460, 461, 462, and 464 are positioned so as to all intersect a plane P3 in a manner in which the table saw assembly 400 may rest on these bumpers when the table saw assembly 400 is stored on its side. So oriented the bumpers can protect the leg units 420 and 430 and the top assembly 402 from damages such as scratches, and substantially reduce sliding of the table saw assembly 400.

The table saw assembly 400 also includes bumpers 466, 467, 468, and 470. The bumpers 466 and 467 are each secured to the downwardly extending leg portions 424 and 434, respectively. The bumper 468 is secured on the downwardly extending leg portion 424 and the transversely extending leg portion 428. The bumper 470 is secured to the downwardly extending leg portion 434 and the transversely extending leg portion 438. The bumpers 466, 467, 468, and 470 are positioned so as to all intersect a plane P4 in a manner in which the table saw assembly 400 may rest on these bumpers when the table saw assembly 400 is stored on its side. So oriented, the bumpers can protect the leg units 420 and 430 and the top assembly 402 from damages such as scratches, and substantially reduce sliding of the table saw assembly 400. The planes P3 and P4 are parallel to each other as shown in FIG. 20.

The table saw assembly 400 also includes bumpers 469' and 469" each secured to the transversely extending leg portion 428, and bumpers 471' and 471" each secured to the transversely extending leg portion 438.

The table saw assembly 400 further includes handle units 480, 482. The handle units 480 and 482 are similar to the handle units 180 and 182 (see FIG. 1).

It should be appreciated that the configuration of the handle units 180 and 182 (or the handle units 480 and 482) and the leg units 120 and 130 (or the leg units 420 and 430) in effect create a cage which is effective to protect various components of the table saw assembly 100 (or 400), such as the height adjustment wheel 198 (or 498), the blade guard 216 (or 526), the dust port 240, the anti-kick back device 221 (or 521), and the miter gauge 242, during transportation of the table saw assembly 100 (or 400). The cage configuration also protects accessories (e.g., the kick back unit 221 (or 521).

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table saw, comprising:
   a support arrangement;
   a table top assembly connected to said support arrangement, said table top assembly having (i) a work piece support surface, and (ii) a saw blade opening defined in said work piece support surface;
   a saw assembly supported under said table top assembly and having a saw blade that extends through said saw blade opening;
   a saw assembly adjustment mechanism having a user actuator, wherein said saw assembly adjustment mechanism is configured so that movement of said user actuator causes movement of said saw blade in relation to said work piece support surface;
   a first extension element extending from said support arrangement and defining a first extension space;
   a second extension element extending from said support arrangement and defining a second extension space, wherein a first protection zone is defined between said first extension space and said second extension space, and wherein said user actuator is completely contained within said first protection zone;
   said first extension element includes (i) a first element portion connected to said support arrangement, (ii) a second element portion connected to said support arrangement, and (iii) a first intermediate element portion interconnecting said first element portion and said second element portion, and
   said second extension element includes (i) a third element portion connected to said support arrangement, (ii) a fourth element portion connected to said support arrangement, and (iii) a second intermediate element portion interconnecting said third element portion and said fourth element portion.

2. A table saw, comprising:

a support arrangement;

a table top assembly connected to said support arrangement, said table top assembly having (i) a work piece support surface, and (ii) a saw blade opening defined in said work piece support surface;

a saw assembly supported under said table top assembly and having a saw blade that extends through said saw blade opening;

a saw assembly adjustment mechanism having a user actuator wherein said saw assembly adjustment mechanism is configured so that movement of said user actuator causes movement of said saw blade in relation to said work piece support surface;

a first extension element extending laterally from said support arrangement and defining a first extension space with said support arrangement, the first extension space defining a first end of a first protection zone;

a second extension element extending laterally from said support arrangement and defining a second extension space with said support arrangement, the second extension space defining a second end of said first protection zone, wherein said first protection zone is defined as a region extending from said first end to said second end and wherein said user actuator is completely contained within said first protection zone;

a first handle unit that includes said first extension element, said first handle unit being connected to said support arrangement;

a second handle unit that includes said second extension element, said second handle unit being connected to said support arrangement; wherein said first handle unit further includes a third extension element that defines a third extension space, said second handle unit further includes a fourth extension element that defines a fourth extension space, a second protection zone is defined between said third extension space and said fourth extension space, said support arrangement includes a front side and a rear side, said first protection zone is located adjacent to said front side of said support arrangement, and said second protection zone is located adjacent to said rear side of said support arrangement.

3. The table saw of claim 2, wherein:

said first extension element includes a first handle structure, and said second extension element includes a second handle structure.

4. The table saw of claim 3, wherein:

said first handle structure includes a first tubular handle structure, and said second handle structure includes a second tubular handle structure.

5. The table saw of claim 2, wherein:

said saw assembly further includes a dust discharge outlet, and said dust discharge outlet is located in said second protection zone.

6. The table saw of claim 2, wherein said saw assembly adjustment mechanism is configured so that:

movement of said user actuator in a first path of movement causes said saw blade to be vertically adjusted in relation to said work piece support surface, and movement of said user actuator in a second path of movement causes said saw blade to be pivotably adjusted in relation to said work piece support surface.

7. The table saw of claim 2, wherein:

said support arrangement includes (i) a first leg unit, and (ii) a second leg unit spaced apart from said first leg unit, said first leg unit defines a first leg opening, said second leg unit defines a second leg opening, said first handle unit extends through said first leg opening and said second leg opening, and said second handle unit extends through said first leg opening and said second leg opening.

8. The table saw of claim 2, further comprising a handle structure, wherein:

said support arrangement includes (i) a first leg unit, and (ii) a second leg unit spaced apart from said first leg unit, said handle structure extends from said first leg unit to said second leg unit, and when said table saw is suspended vertically away from a ground surface by said handle structure, said work piece support surface is substantially vertically oriented due to gravity acting on said table saw.

9. A table saw, comprising:

a support arrangement;

a table top assembly connected to said support arrangement, said table top assembly having (i) a work piece support surface, and (ii) a saw blade opening defined in said work piece support surface;

a saw assembly supported under said table top assembly and having a saw blade that extends through said saw blade opening;

a saw assembly adjustment mechanism having a user actuator, wherein said saw assembly adjustment mechanism is configured so that movement of said user actuator causes movement of said saw blade in relation to said work piece support surface;

a first extension element extending from said support arrangement and defining a first extension space;

a second extension element extending from said support arrangement and defining a second extension space, wherein a first protection zone is defined between said first extension space and said second extension space, and wherein said user actuator is completely contained within said first protection zone;

a first set of bumpers including a first bumper, a second bumper, and a third bumper each being intersected by a first plane, wherein:

said work piece support surface defines a second plane that is substantially perpendicular to said first plane, said support arrangement includes (i) a first leg unit, and (ii) a second leg unit spaced apart from said first leg unit, and each bumper of said first set of bumpers is secured to one of said table top assembly, said first leg unit, and said second leg unit.

10. The table saw of claim 9, further comprising a second set of bumpers including a fourth bumper, a fifth bumper, and a sixth bumper each being intersected by a third plane which is substantially perpendicular to said second plane, wherein each bumper of said second set of bumpers is secured to one of said table top assembly, said first leg unit, and said second leg unit.

11. The table saw of claim 10, wherein:

said table top assembly includes a first lateral side and a second lateral side, said work piece support surface is located between said first lateral side and said second lateral side, said first bumper is secured to said first lateral side, and said fourth bumper is secured to said second lateral side.

12. The table saw of claim 9, wherein:
said first set of bumpers further includes a fourth bumper which is also intersected by said first plane,
said first bumper and said second bumper are secured to said first leg unit, and
said third bumper and said fourth bumper are secured to said second leg unit.

13. The table saw of claim 12, further comprising a second set of bumpers, wherein:
said second set of bumpers includes a fifth bumper, a sixth bumper, a seventh bumper, and an eighth bumper each being intersected by a third plane which is substantially perpendicular to said second plane,
said fifth bumper and said sixth bumper are secured to said first leg unit, and
said seventh bumper and said eighth bumper are secured to said second leg unit.

14. The table saw of claim 9, wherein:
said table top assembly includes a lateral side and a bottom surface which defines a lower table edge therebetween, and
said first bumper has a first portion juxtaposed to said lateral side and a second portion juxtaposed to said bottom surface.

15. A table saw, comprising:
a support arrangement;
a table top assembly connected to said support arrangement, said table top assembly having (i) a work piece support surface, and (ii) a saw blade opening defined in said work piece support surface;
a saw assembly supported under said table top assembly and having a saw blade that extends through said saw blade opening;
a saw assembly adjustment mechanism having a user actuator, wherein said saw assembly adjustment mechanism is configured so that movement of said user actuator causes movement of said saw blade in relation to said work piece support surface;
a first extension element extending from said support arrangement and defining a first extension space;
a second extension element extending from said support arrangement and defining a second extension space, wherein a first protection zone is defined between said first extension space and said second extension space, and wherein said user actuator is completely contained within said first protection zone;
said support arrangement includes (i) a first leg unit, and (ii) a second leg unit spaced apart from said first leg unit,
said first leg unit includes (i) a first tube, (ii) a second tube spaced apart from said first tube, and (iii) a first web extending from said first tube to said second tube, and
said second leg unit includes (i) a third tube, (ii) a fourth tube spaced apart from said third tube, and (iii) a second web extending from said third tube to said fourth tube.

16. The table saw of claim 15, wherein (i) said first leg unit defines a first bend portion, and (ii) said second leg unit defines a second bend portion, further comprising:
a first metallic reinforcement insert interposed between said first tube and said second tube at said first bend portion and secured to said first web; and
a second metallic reinforcement insert interposed between said third tube and said fourth tube at said second bend portion and secured to said second web.

17. A table saw, comprising;
a support arrangement;
a table top assembly connected to said support arrangement, said table top assembly having (i) a work piece support surface, and (ii) a saw blade opening defined in said work piece support surface;
a saw assembly supported under said table top assembly and having a saw blade that extends through said saw blade opening;
a saw assembly adjustment mechanism having a user actuator, wherein said saw assembly adjustment mechanism is configured so that movement of said user actuator causes movement of said saw blade in relation to said work piece support surface;
a first extension element extending from said support arrangement and defining a first extension space;
a second extension element extending from said support arrangement and defining a second extension space, wherein a first protection zone is defined between said first extension space and said second extension space, and wherein said user actuator is completely contained within said first protection zone;
a rip fence configured to be secured to said table top assembly in any of (i) an operative position in which said rip fence is secured to said table top assembly above said work piece support surface, and (ii) a stowed position in which said rip fence is secured to said table top assembly below said work piece support surface, wherein:
said support arrangement includes (i) a first leg unit, and (ii) a second leg unit spaced apart from said first leg unit,
a first storage space is defined between said first leg unit and said table top assembly,
a second storage space is defined between said second leg unit and said table top assembly,
when said rip fence is positioned in said stowed position, said rip fence is located in said first storage space and said second storage space, and
when said rip fence is positioned in said operative, said rip fence is spaced apart from said first storage space and said second storage space.

18. A table saw, comprising:
a support arrangement;
a table top assembly connected to said support arrangement, said table top assembly having (i) a work piece support surface, and (ii) a saw blade opening defined in said work piece support surface;
a saw assembly supported under said table top assembly and having a saw blade that extends through said saw blade opening;
a saw assembly adjustment mechanism having a user actuator, wherein said saw assembly adjustment mechanism is configured so that movement of said user actuator causes movement of said saw blade in relation to said work piece support surface;
a first extension element extending from said support arrangement and defining a first extension space;
a second extension element extending from said support arrangement and defining a second extension space, wherein a first protection zone is defined between said first extension space and said second extension space, and wherein said user actuator is completely contained within said first protection zone;
said support arrangement includes (i) a first leg unit, and (ii) a second leg unit spaced apart from said first leg unit,
said first leg unit has (i) a first downwardly extending leg portion connected to said table top assembly, (ii) a second downwardly extending leg portion spaced apart from said table top assembly, (iii) a third leg portion connected to said table top assembly, (iv) a first transversely extending leg portion interconnecting said first downwardly extending leg portion and said second downwardly extending leg portion, and (v) a second transversely extending leg portion interconnecting said second downwardly extending leg portion and said third leg portion; and a second leg unit having (i) a fourth downwardly extending leg portion connected to said table top assembly, (ii) a fifth downwardly extending leg portion spaced apart from said table top assembly, (iii) a sixth leg portion connected to said table top assembly, (iv) a third transversely extending leg portion interconnecting said fourth downwardly extending leg portion and said fifth downwardly extending leg portion, and (v) a fourth transversely extending leg portion interconnecting said fifth downwardly extending leg portion and said sixth leg portion.

* * * * *